United States Patent
Kaye et al.

(10) Patent No.: US 9,768,816 B2
(45) Date of Patent: Sep. 19, 2017

(54) DEVICE CRADLE AND MANAGEMENT SYSTEM

(71) Applicant: Stephen Kaye, LLC, Ellicott City, MD (US)

(72) Inventors: Stephen T. Kaye, Ellicott City, MD (US); Evan Miles Kaye, Ellicott City, MD (US)

(73) Assignee: Stephen Kaye, LLC, Ellicott City, MD (US)

( * ) Notice: Subject to any disclaimer, the term of this patent is extended or adjusted under 35 U.S.C. 154(b) by 0 days.

(21) Appl. No.: 14/874,408

(22) Filed: Oct. 3, 2015

(65) Prior Publication Data
US 2017/0099071 A1 Apr. 6, 2017

(51) Int. Cl.
*H04M 1/725* (2006.01)
*H04B 1/3877* (2015.01)

(52) U.S. Cl.
CPC ...... *H04B 1/3877* (2013.01); *H04M 1/72577* (2013.01)

(58) Field of Classification Search
CPC ... H04B 1/3877; H04B 1/3888; H02J 7/0036; H02J 7/0045; H02J 7/0047; H02J 2007/005; H01R 13/73; H04M 1/04; H04M 1/11; H04M 1/035; H04M 19/047; H04W 4/12; H04W 88/02; H04N 1/00; H04N 7/163; H04N 7/16
See application file for complete search history.

(56) References Cited

U.S. PATENT DOCUMENTS

| 5,463,742 | A | 10/1995 | Kobayashi | |
| 5,859,628 | A * | 1/1999 | Ross | G06F 3/147 340/990 |
| 6,240,297 | B1 | 5/2001 | Jadoul | |
| 2002/0095588 | A1* | 7/2002 | Shigematsu | G06Q 20/367 713/186 |
| 2014/0018128 | A1* | 1/2014 | Martin | H04M 1/11 455/556.1 |
| 2016/0056647 | A1* | 2/2016 | Choi | H02J 7/0045 320/107 |

OTHER PUBLICATIONS

Amazon FreeTime Unlimited, webpage: http://www.amazon.com/gp/browse.html?node=12528011011; accessed Oct. 3, 2015.
OurPact by ParentsWare, available at: https://itunes.apple.com/us/app/ourpact-parental-control-device/id954029412?mt=8; accessed Oct. 3, 2015.

* cited by examiner

*Primary Examiner* — Thanh Le
(74) *Attorney, Agent, or Firm* — Roberts Mlotkowski Safran Cole & Calderon, P.C.; Jorie L. Stroup

(57) ABSTRACT

A device cradle and device management system monitor and control a usage time of a portable electronic device. The device cradle includes a housing including at least one slot in which a device is disposable and a sensor to detect whether a device is disposed in the slot. The device cradle may be connectable to a server and/or a terminal, which may control the device cradle to monitor whether the device is disposed in a slot of the device cradle. The device cradle may decrease conflict between children and parents regarding use of electronic devices.

17 Claims, 22 Drawing Sheets

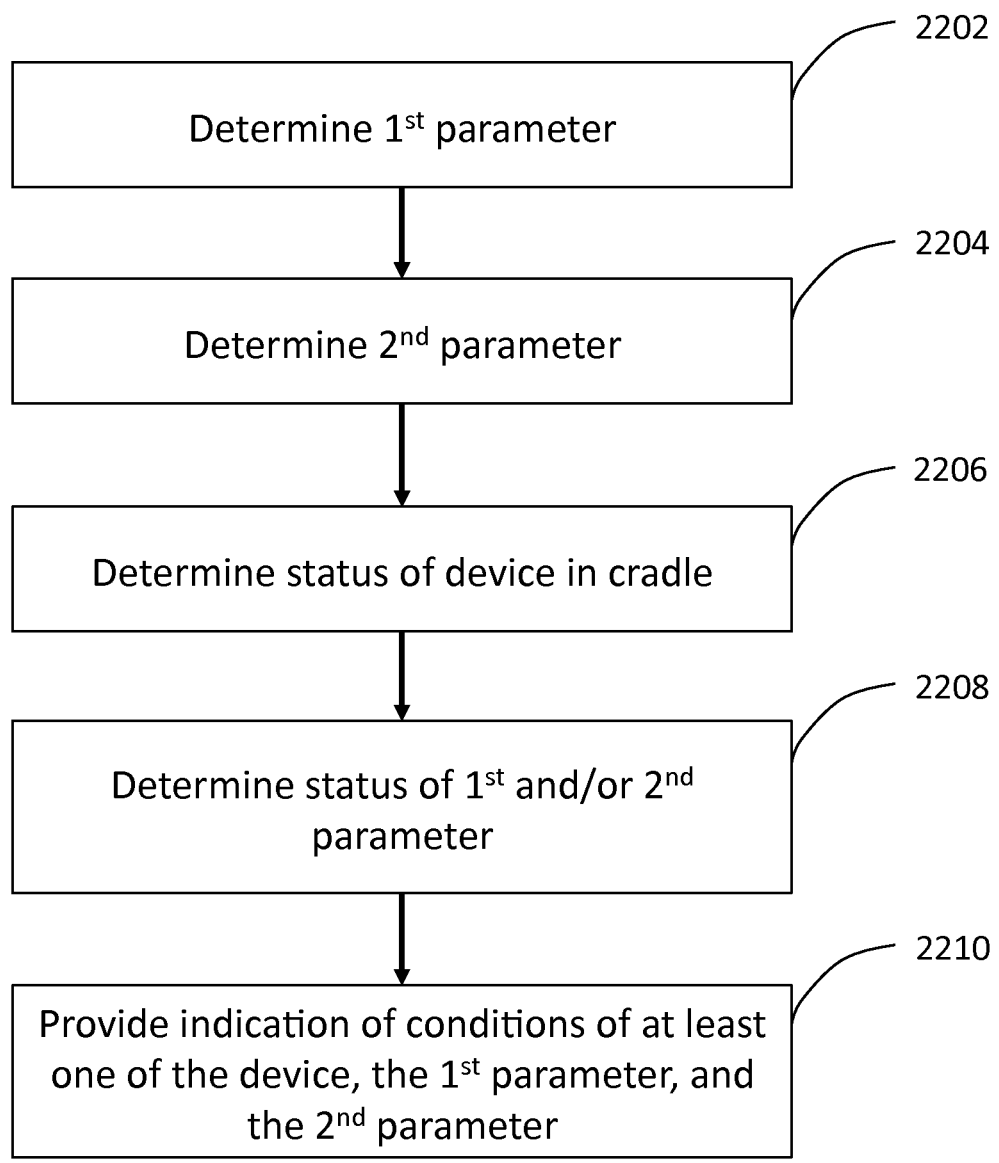

DEVICE CRADLE AND MANAGEMENT SYSTEM

BACKGROUND

1. Field

The present disclosure relates to a device cradle and device management system, and, more particularly, to a device cradle and device management system to monitor and control a usage time of a portable electronic device.

2. Description of the Background

Many parents wish to have more physical control as well as screen time control over their children's mobile devices. Unfortunately, controlling such devices and their use is not only challenging, but also very time consuming for the parents. In fact, most parents admit to not having a consistent mobile device usage policy or convenient way to enforce that policy. As a consequence, random or ad hoc decisions often result in parent/child conflict.

Device-specific software applications have been used to monitor and control device usage. For example, both free and paid applications attempt to monitor and control which apps can be accessed and/or the amount of screen time available. Applications often use various software techniques to set usage limits and/or "lock down" child devices. And, such applications are affordable, often free, can be used anywhere at any time, and require no accompanying hardware.

However, such software-based management and control options often have drawbacks. For example, it may be difficult to find a quality device control application among the millions of applications available. And, providing authority to control other/eternal devices to a third party application provokes security and privacy concerns when the source of the application is not a well-known entity or provider.

Moreover, management and control applications are often limited to use with a single device or with a single operating system such that all of the devices must be based on that operating system. Others are designed to control only a single device. Many parents have the unenviable task of trying to manage a variety of devices employing more than one operating system across one or more children. In this scenario, the parent would have to acquire, learn, operate and update a number of different management and control applications in order to manage all of the individual devices. Typically, each control application has its own user interface and feature set, making it practically impossible to manage all of the devices in a unified and consistent way. For example, in a family with two children and four devices, the parent would likely have to make changes to four different control applications just to change the amount of screen time a family's two children are allowed to have on a particular day. Furthermore, each control application has no knowledge of the state of any other, leaving it up to the parents to maintain consistency across all of the children's devices.

There is need for a device that helps families organize and manage the everyday use of their children's full range of mobile devices in a simple, cohesive, and unified way, independent of the number of devices, or the operating systems employed.

SUMMARY

Exemplary embodiments of the present invention provide a device cradle and device management system to monitor and control a usage time of a portable electronic device so that authority over use of the device is provided by the device cradle to reduce conflicts between, for example, a child and a parent. Such authority transfer allows the child to understand what to expect each day and learn to manage the provided time.

Additional features of the invention will be set forth in the description which follows, and in part will be apparent from the description, or may be learned by practice of the invention.

Exemplary embodiments of the present invention provide a device cradle including a housing comprising at least one slot in which a device is disposable; and a sensor to detect whether a device is disposed in the slot.

Exemplary embodiments further provide that the sensor is an optical sensor disposed to detect whether the device is disposed in the slot.

Exemplary embodiments further provide that the optical sensor emits and senses a light beam, and the optical sensor detects a device disposed in the slot when the device interrupts the light beam.

Exemplary embodiments further provide a connection port connectable to a device disposed in the slot.

Exemplary embodiments further provide a display provided in the housing to display a condition of a device associated with the at least one slot.

Exemplary embodiments further provide an audio input/output provided in the housing to indicate a condition of a device associated with the at least one slot.

Exemplary embodiments further provide that the audio input/output outputs an alarm upon expiration of a usage time for the device associated with the at least one slot.

Exemplary embodiments further provide an indicator provided in the housing to indicate a condition of a device associated with the at least one slot, the indicator being a light emitting device.

Exemplary embodiments further provide that the condition of the device associated with the at least one slot is that a usage time for the device is available.

Exemplary embodiments further provide that the condition of the device associated with the at least one slot is that a usage time for the device is less than a threshold time.

Exemplary embodiments further provide that the condition of the device associated with the at least one slot is that a usage time for the device is expired.

Exemplary embodiments further provide a timer to increment a time in which a device associated with the at least one slot is not disposed in the slot.

Exemplary embodiments further provide a display to display a remaining time incremented by the timer, the remaining time being a time until a device associated with the at least one slot is to be disposed in the at least one slot.

Exemplary embodiments further provide a cable spindle disposed in the housing to retract and allow extension of a cable connectable to the device cradle and a device associated with the at least one slot.

Exemplary embodiments provide a device cradle including a housing including at least one slot in which a device is disposable and a sensor to detect whether a device is disposed in the slot; a server connected to the device cradle; and a terminal to control the device cradle to monitor whether the device is disposed in the slot.

Exemplary embodiments further provide that the terminal controls the device cradle to monitor the device according to a first parameter.

Exemplary embodiments further provide that the first parameter determines a park time in which the device is to be disposed in a slot of the device cradle and an available screen time in which the device is removable from the slot of the device cradle.

Exemplary embodiments further provide that the terminal further controls the device cradle to monitor the device according to a second parameter.

Exemplary embodiments further provide that the first parameter determines a park time in which the device is to be disposed in a slot of the device cradle and an available screen time in which the device is removable from the slot of the device cradle, and wherein the second parameter determines a usage time in which the device may be removed from the slot of the device cradle.

Exemplary embodiments further provide that the usage time is less than the available screen time.

Exemplary embodiments of the present invention provide a method of controlling usage of a device via a device cradle, the method including determining a first parameter, the first parameter indicating at least an available screen time and a park time; determining a status of the first parameter; determining a status of a device associated with a slot of a device cradle, the status of the device indicating at least one of whether the device is disposed in the slot and whether the device is connected to the device cradle; and indicating a condition of the first device based upon the determined status of the first parameter and the determined status of the device.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 22 illustrates a method of operation of the device cradle according to aspects of the present invention.

DETAILED DESCRIPTION

Figure 1:
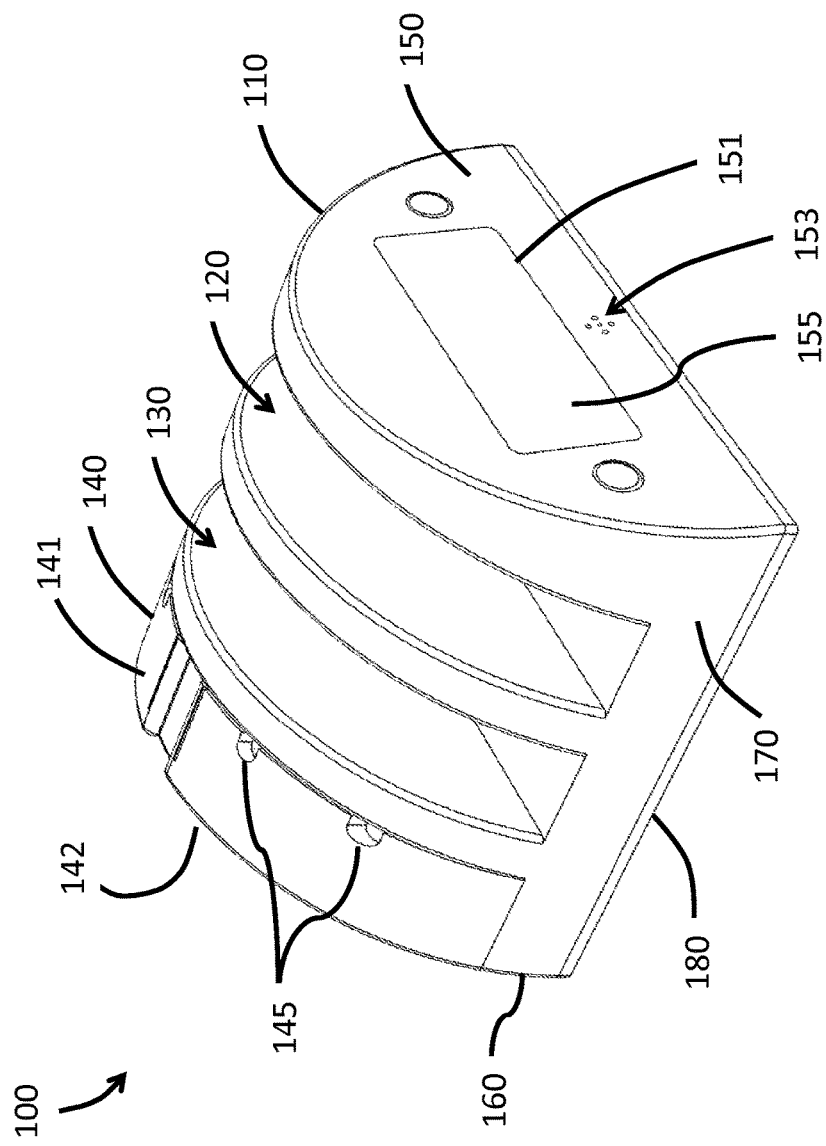
FIG. 1 is a perspective view of a device cradle according to exemplary embodiments of the present invention.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the drawings, like reference numerals denote like elements. The shape, size and regions, and the like, of the drawing may be exaggerated for clarity.

The terminology used herein is for the purpose of describing particular embodiments only and is not intended to be limiting of this disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a perspective view of a device cradle according to exemplary embodiments of the present invention. The device cradle 100 includes a housing 110 having a first slot 120, a second slot 130, a cover portion 140, and a window 151. The device cradle 100 further includes a display 155 visible via the window 151.

The housing 110 has a generally semicylindrical shape in which the first slot 120 and the second slot 130 are provided. Although described as generally semicylindrical, aspects are not limited thereto such that the housing 110 may have another shape in which the first slot 120 and the second slot 130 are provided. For example, the shape of the housing 110 may be a generally rectangular prism, a generally triangular prism, a generally semielliptical prism, or other generally geometric prism including the first slot 120 and the second slot 130.

The housing 110 includes a front surface 150 including a window 151 provided therein, a rear surface 160, a top surface 170 disposed between the front surface 150 and the rear surface 160, and a bottom surface 180 disposed between the front surface 150 and the rear surface 160. The cover portion 140 connects to and disconnects from the housing 110 and includes a top portion 141 and a rear portion 142. The top portion 141 of the cover portion 140 has a general shape similar to and that aligns with the shape of the top surface 170 of the housing 110. The rear portion 142 of the cover portion 140 has a generally planar shape and aligns with the rear surface 160 of the housing 110. The bottom surface 180 is generally planar and provides a base on which the device cradle 100 sits.

The front surface 150 of the housing 110 may be parallel to the rear surface 160 of the housing 110 and the rear portion 142 of the cover portion 140. However, aspects need not be limited thereto such that the front surface 150 of the housing 110 may be disposed at an angle with respect to the rear surface 160 of the housing 110 and the rear portion 142 of the cover portion 140. For example, if the rear surface 160 of the housing 110 and the rear portion 142 of the cover portion 140 form a generally right angle with respect to the bottom surface 180, the front surface 150 may be provided at an angle less than 90° with respect to the bottom surface 180. For example, the front surface 150 may be provided at an angle of 75° to less than 90° with respect to the bottom surface 180. The front surface 150 may be angled so as to improve a sight angle of the display 155 as the user is approaching and using the cradle. Further, the rear surface 160 of the housing 110 and the rear portion 142 of the cover portion 140 need not be provided at an angle of 90° with respect to the bottom surface 180; for example, the rear surface 160 of the housing 110 and the rear portion 142 of the cover portion 140 may be provided at an angle of 75° to less than 90° with respect to the bottom surface 180.

The window 151 may be an area of the front surface 150 of the housing 110 that is clear or transparent through which the display 155 may be visible, or the window 151 may be an aperture provided in the front surface 150 through which the display 155 may be visible or disposed. The display 155 may be a visible indicator capable of indicating a mode of the device cradle 100 with respect to a portable device associated with the device cradle 100 and/or indicating a condition of a portable device associated with the device cradle 100. For example, the display 155 may be a liquid crystal display, a light emitting diode (LED), an LED display, or the like. The window 151 need not be rectangular as shown in FIG. 1 but may have a shape corresponding to the display 155. Further, there may be more than one window 151 in the front surface 150 of the housing 110 to correspond to more than one display 155. If more than one display 155 is included in the device cradle 100, each display 155 need not be a same shape or of a same type. For example, one display 155 may be an LCD display while another one or more displays 155 may be LEDs or LED displays. Further, the front surface 150 includes holes 153 through which sound may be transmitted for a speaker and/or microphone, but aspects are not limited thereto.

The cover portion 140 is connectable to and disconnectable from the housing 110 and provides accessible storage for wires and the like as well as cover and protection of various ports and/or connections for electronic devices described herein. The top portion 141 of the cover portion 140 may include one or more openings 145 to allow access to a cavity formed by the cover portion 140 and the housing 110. The one or more openings 145 may be through-holes in the top portion 141 or notches at an edge of the top portion 141 through which one or more wires or cords are extendable. Although the top portion 141 of the cover portion 140 is shown in FIG. 1 as including the one or more openings 145, aspects need not be limited thereto such that the top portion 141 may be solid and continuous. Further, although not shown in FIG. 1, the rear portion 142 of the cover portion 140 may also include one or more opening 155 through which one or more wires or cords are extendable. According to aspects of the invention, the cover portion 140 may be connected to the housing via one or more hinges so as to be generally not removable.

The first slot 120 and the second slot 130 are provided in the top surface 170 of the housing 110 of the device 100 to each accommodate a portable electronic device, for example, a mobile terminal, a smartphone, a tablet computer, a laptop computer, a handheld gaming device or controller, a wearable device, or other device or object for which monitoring is desired. The first slot 120 and the second slot 130 may each have a depth sufficient to securely and safely support a large tablet computer or a laptop computer, for example, 45 mm to 75 mm. Further, the first slot 120 and the second slot 130 may each be of a width sufficient to accommodate a large tablet computer or a laptop computer, for example, 18 mm to 28 mm. The depths and widths of the first slot 120 and the second slot 130 may be adjustable to accommodate smaller or larger devices. For example, the depths and widths of the first slot 120 and the second slot 130 may be changed via an insert or a shim as described herein. Further, although described as including the first slot 120 and the second slot 130, aspects need not be limited thereto such that the device cradle 100 may include fewer slots, for example, 1 slot, or more slots, for example, 3 or 4 slots. Moreover, the device cradle 100 may include more than 4 slots to accommodate more than 4 devices.

Figure 2:
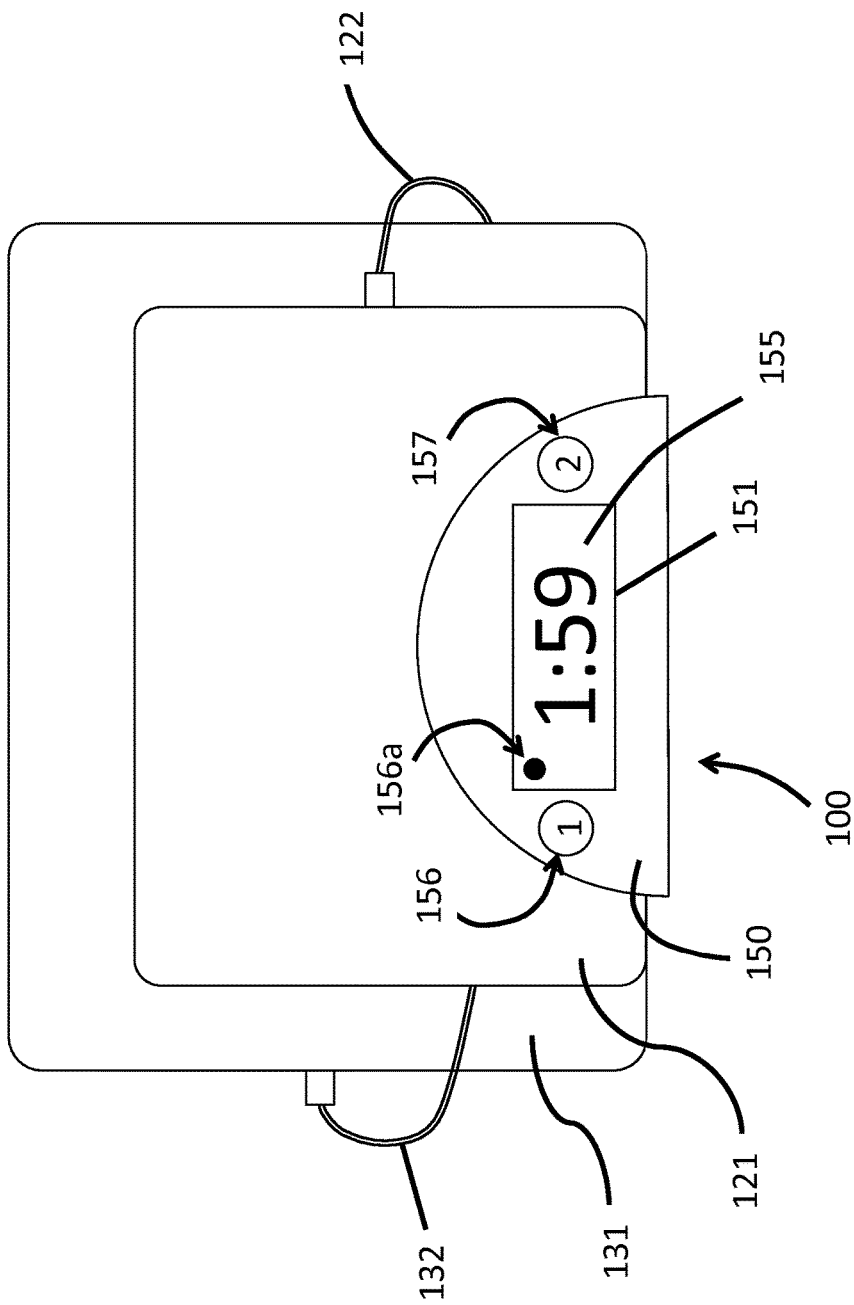
FIG. 2 is a front view of the device cradle according to aspects of the present invention.

FIG. 2 is a front view of the device cradle according to aspects of the present invention. As shown in FIG. 2, the device cradle 100 accommodates a first device 121 and a second device 131. The first device 121 is disposed in the first slot 120 of the housing 110 of the device cradle 100, and the second device 131 is disposed in the second slot 130 of the housing 110 of the device cradle 100. The first device 121 is provided with a first device connector 122, and the second device 131 is provided with a second device connector 132. Each of the first device connector 122 and the second device connector 132 are appropriate for the respective first device 121 and the second device 131. The first device connector 122 and the second device connector 132 may provide an electrical connection appropriate for charging and/or communicating with each of the first device 121 and the second device 131. For example, the device cradle 100 may include a wired and/or wireless connection described herein so that the device cradle 100 may provide updates or transfer data to and/or from the connected first device 121 and the second device 131. However, aspects need not be limited thereto such that the first device connector 122 and the second device connector 132 may provide only charging capabilities. The first device connector 122 and the second device connector 132 may each be a charging connection provided with or appropriate for the first device 121 and the second device 131, respectively, for charging the device. For example, if the first device 121 is an APPLE IPHONE 6, the first device connector 122 may be an APPLE LIGHTNING to universal serial bus (USB) cable having the APPLE LIGHTNING connector connected to the first device 121, and the USB connector may be connected to a USB port provided in the device cradle 100 as described herein to provide power for charging the first device 121. Similarly, other devices may be charged according to their appropriate connectors.

As shown in FIG. 2, the front surface 150 of the housing 110 of the device cradle 100 includes the window 151 and the display 155. The display 155 may indicate a current time or a remaining time of use available for a device among other information as described herein. Further, the front surface 150 may include a first device indicator 156 and a second device indicator 157 that may indicate a condition of the respective first device 121 and the second device 131 and/or a mode of the device cradle 100 with respect to the respective first device 121 and the second device 131. The first device indicator 156 and the second device indicator 157 may be at least one of LCDs, LEDs, and LED displays to communicate the information about the first device 121 and the second device 131, respectively. As shown in FIG. 2, the first device indicator 156 may be in the shape of the numeral "1", and the second device indicator 157 may be in the shape of the numeral "2"; however, aspects need not be limited thereto such that the first device indicator 156 and the second device indicator 157 may have other shapes. For example, the first device indicator 156 and the second device indicator 157 may be a geometric shape and may be the same or different. Further, the first device indicator 156 and/or the second device indicator 157 may be incorporated into the display 155 such that the display 155 indicates the condition of the first device 121 and the second device 131 and/or the mode of the device cradle 100 with respect to the first device 121 and the second device 131. However, aspects need not be limited thereto such that the first device indicator 156 and the second device indicator 157 need not be able to be lit but may instead be merely indicators to indicate the associated slot.

The first device 121 and the second device 131 may be associated with or assigned to the first slot 120 and the second slot 130, respectively, such that the first device indicator 156 and the second device indicator 157 and/or the display 155 may indicate various conditions of the specific first device 121 and the second device 131 and/or modes of the device cradle 100 as well as monitor, track, and police the usage of the specific first device 121 and the second device 131. The various conditions of the first device 121 and the second device 131 and/or modes of the device cradle 100 may be indicated by the first device indicator 156 and the second device indicator 157 by flashing, frequency of flashing, color, brightness, and the like, and combinations thereof.

Figure 3:
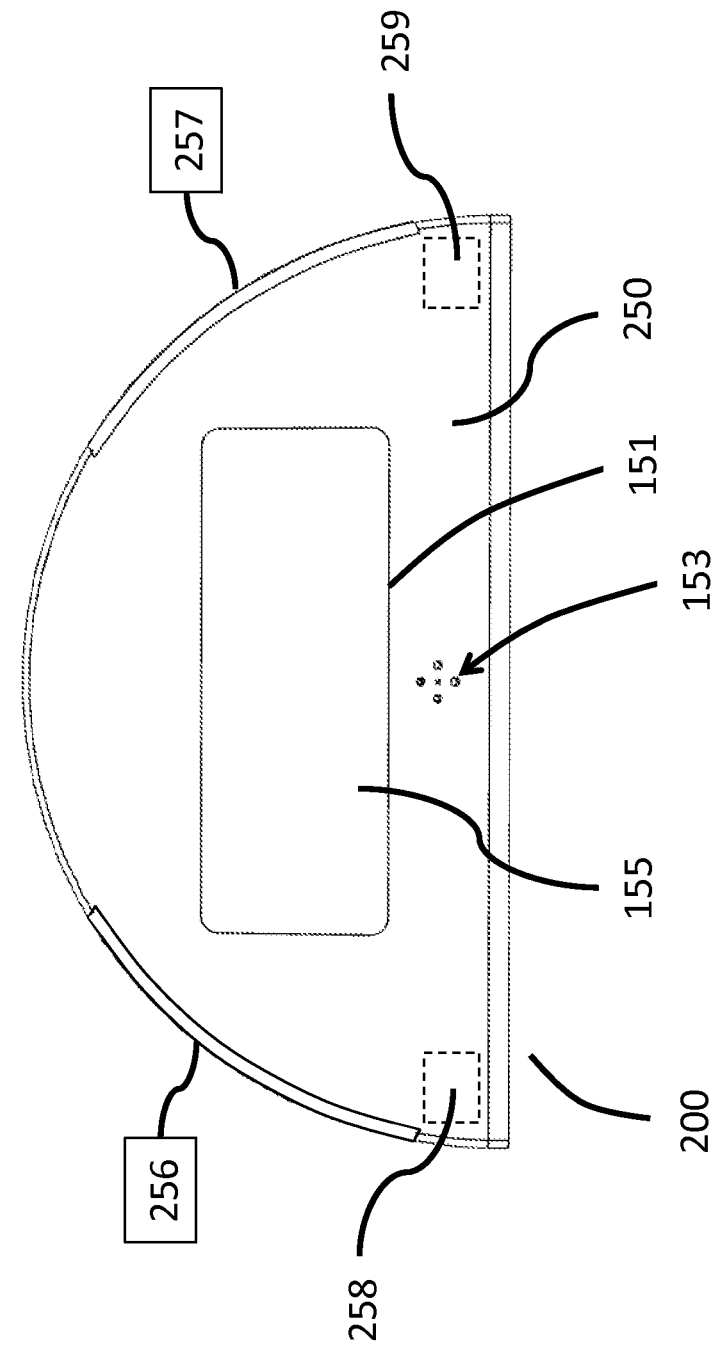
FIG. 3 is a front view of a device cradle according to aspects of the present invention.

Further, other configurations of indicators are available. For example, FIG. 3 is a front view of a device cradle according to aspects of the present invention. A device cradle 200 includes a window 151 in a front surface 250 through which a display 155 is visible. Further, the front surface 250 includes holes 153 through which sound may be transmitted for a speaker and/or microphone, but aspects are not limited thereto. The device cradle 200 includes a first device indicator 256 and a second device indicator 257. The first device indicator 256 and the second device indicator 257 indicate a condition of the respective first device 121 and the second device 131 and/or a mode of the device cradle 200 with respect to the respective first device 121 and the second device 131 as described herein. As shown in FIG. 3, the front face 250 of the device cradle 200 has a generally half-circle shape. In such case, the first device indicator 256 and the second device indicator 257 may each extend along an edge of the front face 250 for about 45°; however, aspects need not be limited thereto such that the first device indicator 256 and the second device indicator 257 may each extend along an edge of the front face 250 for 90° or fewer. Each of the first device indicator 256 and the second device indicator 257 may extend onto the top surface 170 of the housing 110 or may be wholly contained on the front surface 250. Each of the first device indicator 256 and the second device indicator 257 may be an LED or a light pipe making light received from an LED externally visible. For example, the first device indicator 256 may receive light from first LED 258 and transmit the received light externally to indicate the condition of the first device 121 and/or a mode of the device cradle 200 with respect to the first device 121. Similarly, the second device indicator 257 may receive light from first LED 259 and transmit the received light externally to indicate the condition of the second device 131 and/or a mode of the device cradle 200 with respect to the second device 131. Although only the first device indicator 256 and the second device indicator 257 are illustrated, aspects need not be limited thereto such that the device cradle 200 may include more or fewer device indicators to indicate the condition of associated devices and/or mode of the device cradle with respect to the associated devices.

Figure 4:
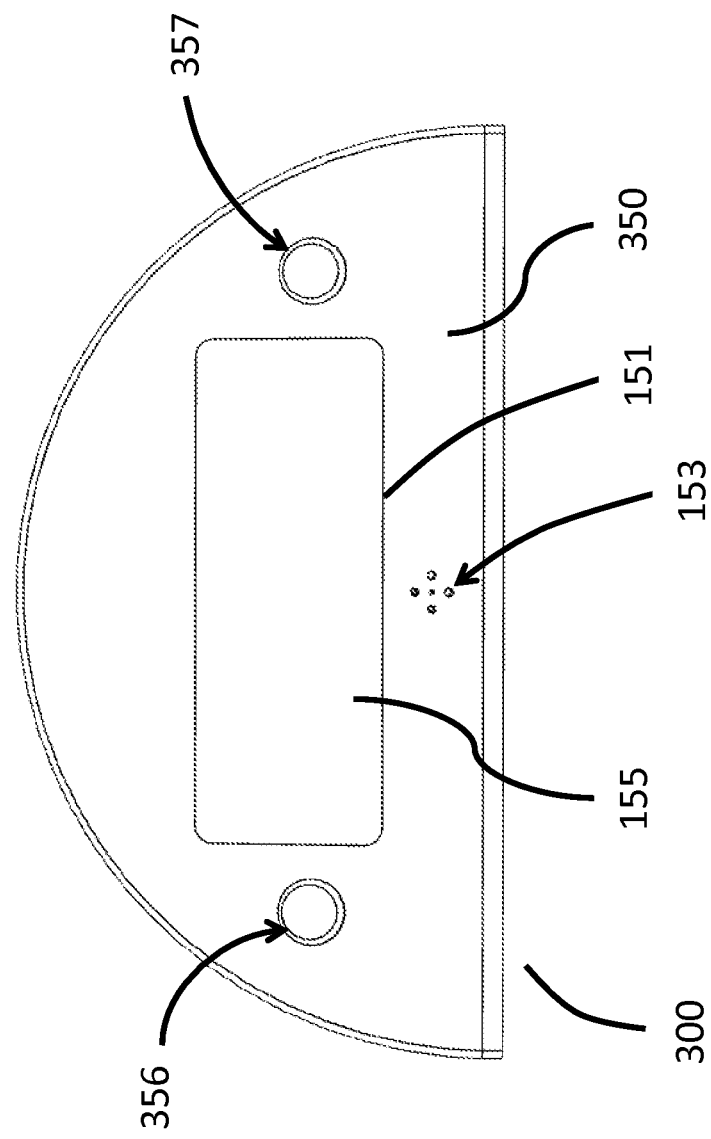
FIG. 4 is a front view of a device cradle according to aspects of the present invention.

FIG. 4 is a front view of a device cradle according to aspects of the present invention. A device cradle 300 includes a window 151 in a front surface 350 through which a display 155 is visible. Further, the front surface 350 includes holes 153 through which sound may be transmitted for a speaker and/or microphone, but aspects are not limited thereto. The device cradle 300 includes a first device indicator 356 and a second device indicator 357. The first device indicator 356 and the second device indicator 357 indicate a condition of the respective first device 121 and the second device 131 and/or a mode of the device cradle 300 with respect to the first device 121 and the second device 131 as described herein. Each of the first device indicator 356 and the second device indicator 357 may be an LED or a light indicator making light received from an LED externally visible. For example, the first device indicator 356 may receive light from first LED (not shown) and transmit the received light externally to indicate the condition of the first device 121 and/or a mode of the device cradle 300 with respect to the first device 121. Similarly, the second device indicator 357 may receive light from first LED (not shown) and transmit the received light externally to indicate the condition of the second device 131 and/or a mode of the device cradle 300 with respect to the second device 131. The first device indicator 356 may include a non-illuminated portion in the shape of the numeral "1" to indicate association with the first slot 120 and the first device 121 such that signals provided by the first device indicator 356 indicate the condition of the first device 121 and/or a mode of the device cradle 300 with respect to the first device 121. The second device indicator 357 may include a non-illuminated portion in the shape of the numeral "2" to indicate association with the second slot 130 and the second device 131 such that signals provided by the first device indicator 357 indicate the condition mode of the second device 131 and/or a mode of the device cradle 300 with respect to the second device 131. Although only the first device indicator 356 and the second device indicator 357 are illustrated, aspects need not be limited thereto such that the device cradle 300 may include more or fewer device indicators to indicate the condition of associated devices and/or a mode of the device cradle 300 with respect to the associated devices.

Figure 5:
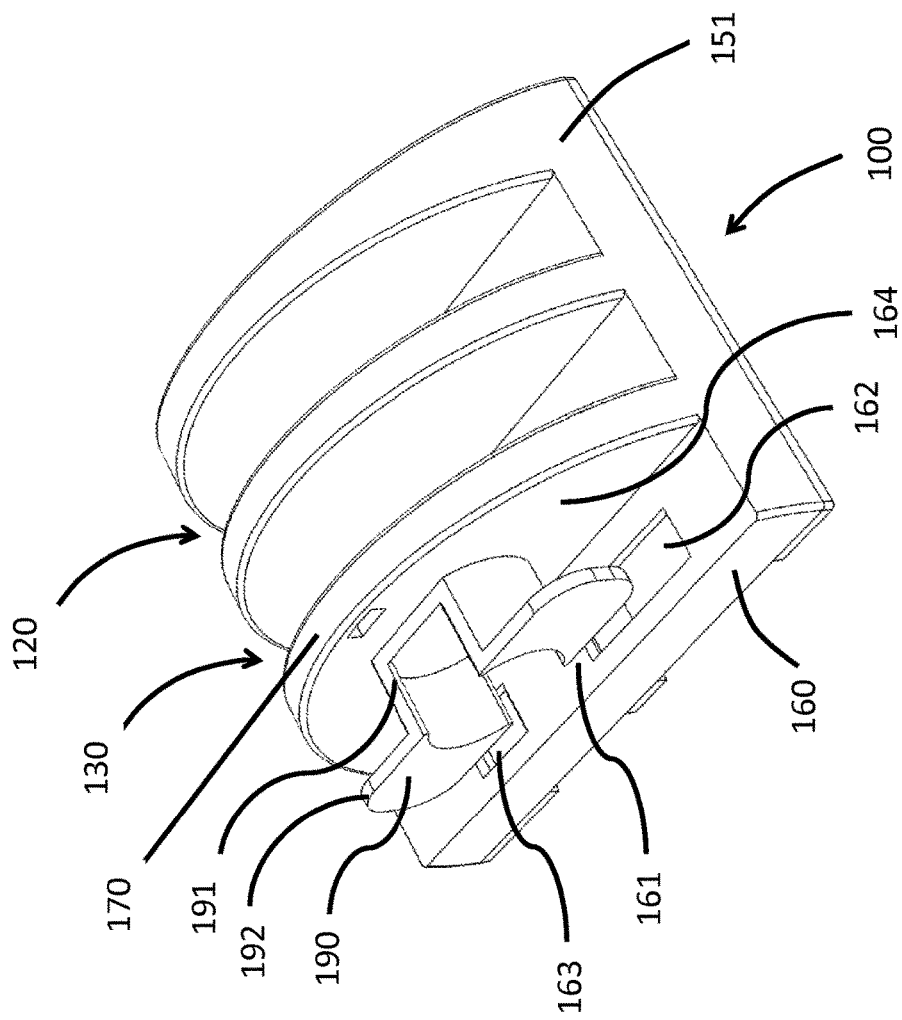
FIG. 5 is a rear perspective view of a device cradle according to aspects of the present invention.

FIG. 5 is a rear perspective view of a device cradle according to aspects of the present invention. In FIG. 5, the device cradle 100 is illustrated with the cover portion 140 removed so as to expose the cavity formed by the cover portion 140 and the housing 110. The housing 110 includes a cavity surface 161 in which openings 162 and 163 are disposed.

Connection ports and/or power connection ports to provide data and/or power sources for the first device 121 and the second device 131 disposed respectively in the first slot 120 and the second slot 130 may be disposed or accessible in the cavity surface 161 and/or a cavity wall 164. However, aspects need not be limited thereto.

A cable spindle 190 is provided in the cavity formed by the cover portion 140 and the housing 110 and may provide for extension and retraction of the first device connector 122 and the second device connector 132 through the openings 145 of the cover portion 140. Such storage of the first device connector 122 and the second device connector 132 provides for a clean and clutter-free appearance of the device cradle 100 and surrounding areas. Further, the cable spindle 190 may also provide for extension and retraction and/or storage of a power cord 167 connected to the power connection port 165 and connectable to an outlet through one of the openings 145 of the cover portion 140. The cable spindle 190 is provided on a projection 191 that extends from the cavity wall 165 to provide space for the first device connector 122, the second device connector 132, and the power connector 167 to be disposed the cavity about the cable spindle 190 between lips 192 of the spindle 190 and the cavity wall 165. The cable spindle 190 may be only a spindle about which the first device connector 122, the second device connector 132, and/or the power connector 167 may be wound. The cable spindle 190 allows for only a limited amount of the first device connector 122 and the second device connector 132 to be disposed outside of the device cradle 100 so as to burden a user attempting to use one of the first device 121 and the second device 131 in contradiction to the parameters set for such device.

Figure 6:
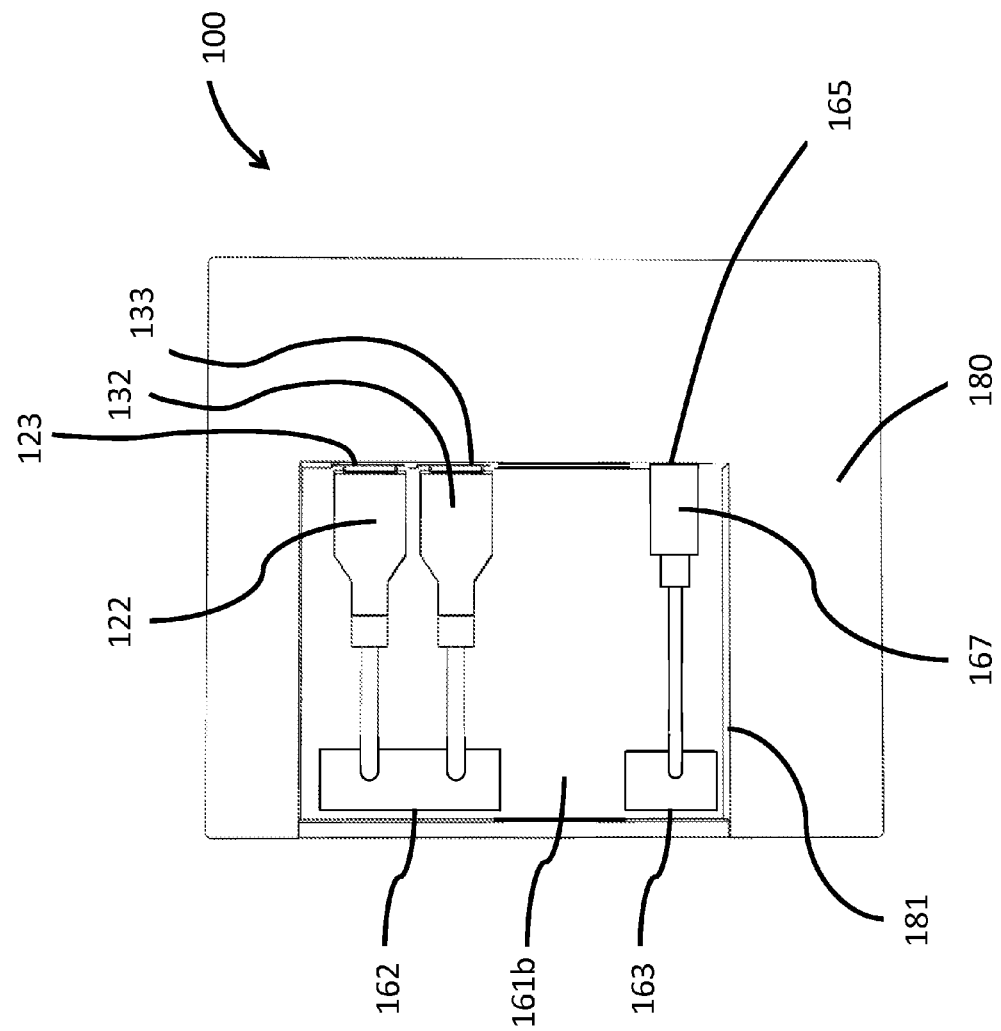
FIG. 6. is a bottom view of a device cradle according to aspects of the present invention.

FIG. 6. is a bottom view of a device cradle according to aspects of the present invention. The device cradle 100 includes the bottom surface 180 in which is provided an opening 181 to provide access to various connection ports. For example, connection ports may be provided to be accessible via the opening 181. As shown in FIG. 6, the first device connector 122 and the second device connector 132 are connected to connection ports and are accessible via the opening 181 to provide data and/or power to the first device 121 and the second device 131. The first slot connection port 123 and the second slot connection port 133 may each be, independently, one of a universal serial bus (USB) port, a mini-USB port, or the like. Further, although only the first slot connection port 123 and the second slot connection port 133 are illustrated, the device cradle 100 may include more or fewer connection ports independent from a number of slots provided in the housing 110. For example, the device cradle 100 may include the first slot 120 and the second slot 130 in the housing 110 and include the first slot connection port 123 and the second slot connection port 133 as well as include additional connection ports, for example, of a different type or standard. Similarly, a power connector 167 is connected to a power connection port 165 accessible via the opening 181 to provide power to the device cradle 100. The power connection port 165 provides a power jack into which an alternating current is input. The power connection port 165 may be detachable from or hardwired into the device cradle 100, and the power connection port 165 may be connected to a standard wall outlet to provide power to the device cradle 100. The first device connector 122, the second device connector 132, and the power connector 167 extend through openings 162 and 163 provided in the cavity surface 161 as shown in FIG. 6 as a bottom 161*b* of the cavity surface 161 to extend into the cavity formed by the cover portion 140 and the housing 110 to be wrapped around the cable spindle 190 in the cavity. Although shown as two openings, aspects need not be limited thereto such that openings 162 and 163 may be one opening or may be three or more openings in the cavity surface 161 to provide access to the cavity formed by the cover portion 140 and the housing 110. Further, the opening 181 may be covered or closed with a cover (not shown) or may not be present such that the connection ports are accessible via the rear surface 160 of the housing 110 or via an opening in the rear surface 160 of the housing 110 and the bottom surface 180 extends wholly and completely from the front surface 150 to the rear surface 160.

Figure 7:
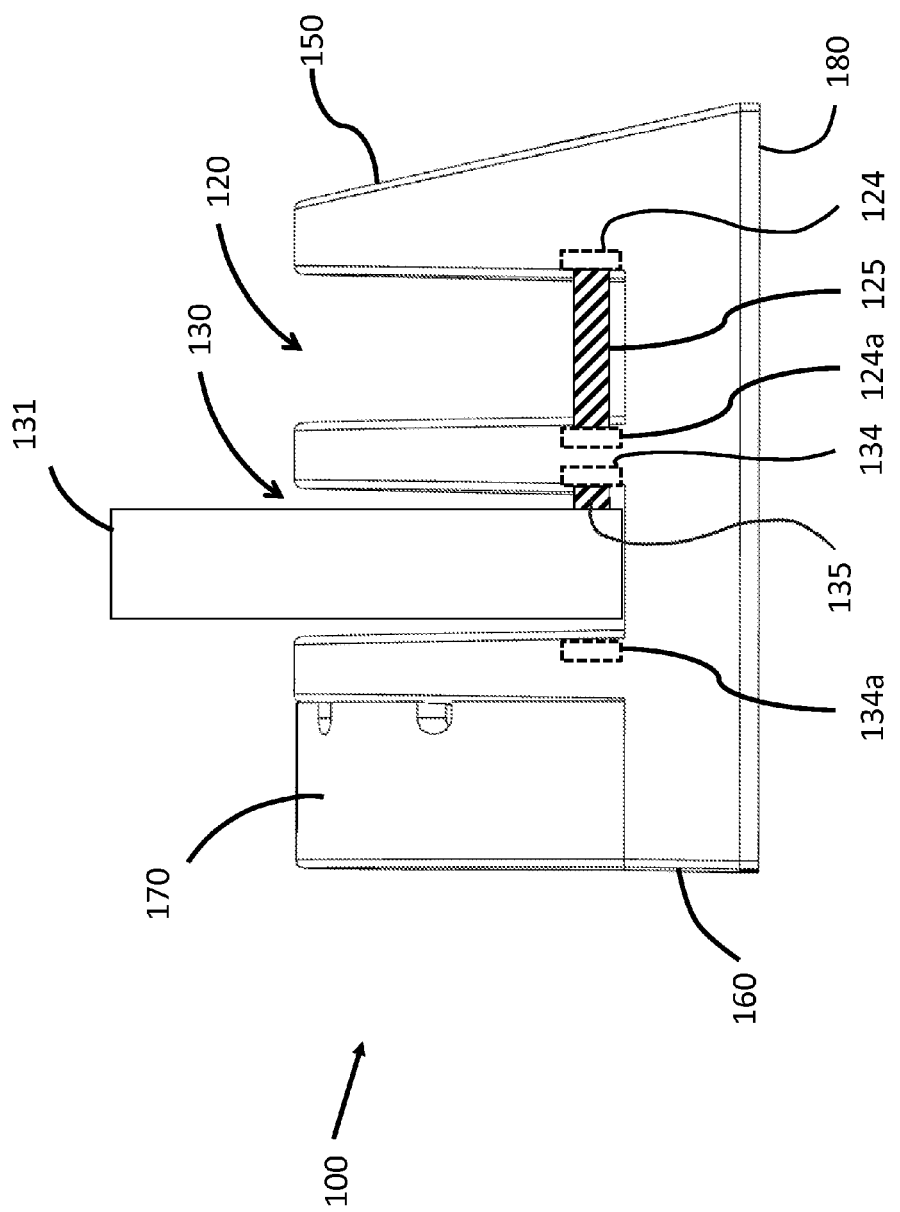
FIG. 7 is a side view of a device cradle according aspects of the present invention.

FIG. 7 is a side view of a device cradle according aspects of the present invention. The device cradle 100 includes the first slot 120, the second slot 130, the front surface 150, the rear surface 160, the top surface 170, and the bottom surface 180. A first slot optical sensor 124/124*a* is provided in the first slot 120 to indicate whether the first device 121 is present in the first slot 120. For example, the first slot optical sensor 124/124*a* emits a first slot optical beam 125 that indicates no device is disposed in the first slot 120 when the first slot optical beam 125 travels unimpeded and the optical circuit is closed. The first optical sensor 124/124*a* may include a first portion 124 and a second portion 124*a*. At least one of the first portion 124 and the second portion 124*a* may be an optical transmitter or an optical transmitter/receiver, and the other of the first portion 124 and the second portion 124*a* may be an optical reflector or an optical receiver. The second slot 130 includes a second slot optical sensor 134/134*a* to emit a second slot optical beam 135 to indicate the presence of the second device 131 in the second slot 130. For example, when the second device 131 is present in the second slot 130, the second device 131 impedes the second slot optical beam 135 such that the optical circuit is open, thereby indicating that the second device 131 is present in the second slot 130. The second optical sensor 134/134*a* may include a first portion 134 and a second portion 134*a*. At least one of the first portion 134 and the second portion 134*a* may be an optical transmitter or an optical transmitter/receiver, and the other of the first portion 134 and the second portion 134*a* may be an optical reflector or an optical receiver.

The first slot optical sensor 124/124*a* and the second slot optical sensor 134/134*a* may each be an infrared light emitter and detector and may each include an LED emitter. Although described as optical sensors, aspects need not be limited thereto such that a contact or other switch may be provided on a bottom surface of the slot such that a device a disposed in the slot activates the switch to indicate the presence of the device in the slot. Further, the switch may be a proximity switch that measures an impedance, changes in impedance, magnetic field, changes in magnetic field, and the like, to indicate the presence of the device in the slot.

Figure 8:
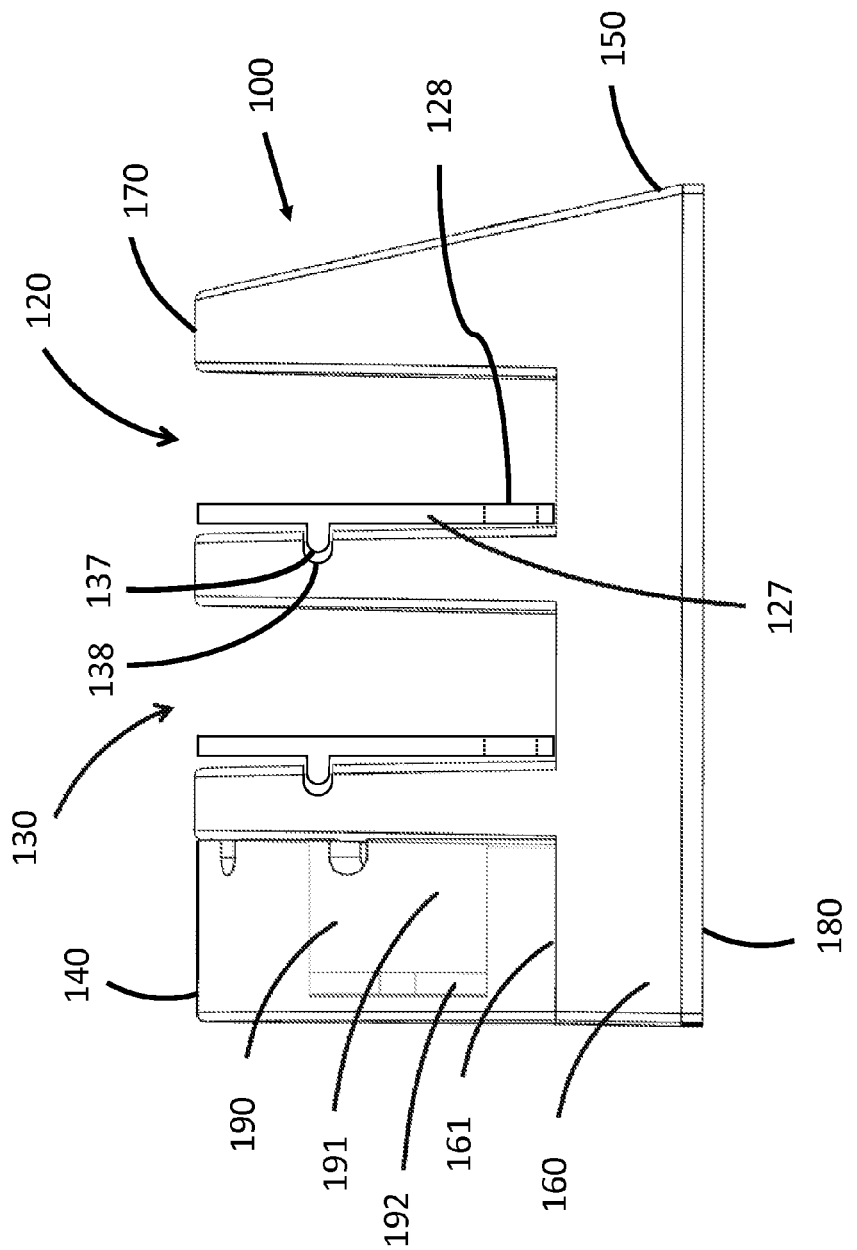
FIG. 8 is a cross-sectional view of a device cradle according aspects of the present invention.

FIG. 8 is a cross-sectional view of a device cradle according aspects of the present invention. As described herein, a width of the slots may be adjustable. As shown in FIG. 8, the device cradle 100 includes the first slot 120 and the second slot 130. A shim 127 may be provided on one or more sides of each of the first slot 120 and the second slot 130 to decrease a width of one or more of the first slot 120 and the second slot 130. The shim 127 may have a thickness sufficient to decrease the width of the slots to accommodate devices of various sizes. For example, the shim 127 may have a thickness of 2.5 mm to 5 mm but aspects are not limited thereto.

Further, the shim 127 includes an opening 128 provided in a portion of the shim 127 that aligns with the first slot optical sensor 124 and/or the second slot optical sensor 134 so that the first slot optical beam 125 and/or the second slot optical sensor 135 may travel unimpeded by the shim 127.

The shim 127 may include a protrusion 137, and each of the first slot 120 and the second slot 130 may include a portion 138 to accept the protrusion 137 of the shim. Aspects need not be limited thereto such that the first slot 120 and the second slot 130 may include the protrusion 137, and the shim 127 may include the portion 138 to accept the protrusion 137. The portion 138 may be a recess or a hole disposed to accept the protrusion 137. Further, plural protrusions 137 and portions 138 may be provided in each of the shim 127, the first slot 120, and the second slot 130.

As shown in FIG. 8, the shims 127 are secured in the first slot 120 by the protrusions 137 and portions 138 to decrease the width of the first slot 120 to better accommodate a relatively thinner first device 121. Although one shim 127 is shown in each slot, aspects need not be limited thereto such that more than one shim 127 may be disposed in at least one of the first slot 120 and/or the second slot 130 to decrease the widths thereof.

Figure 9:
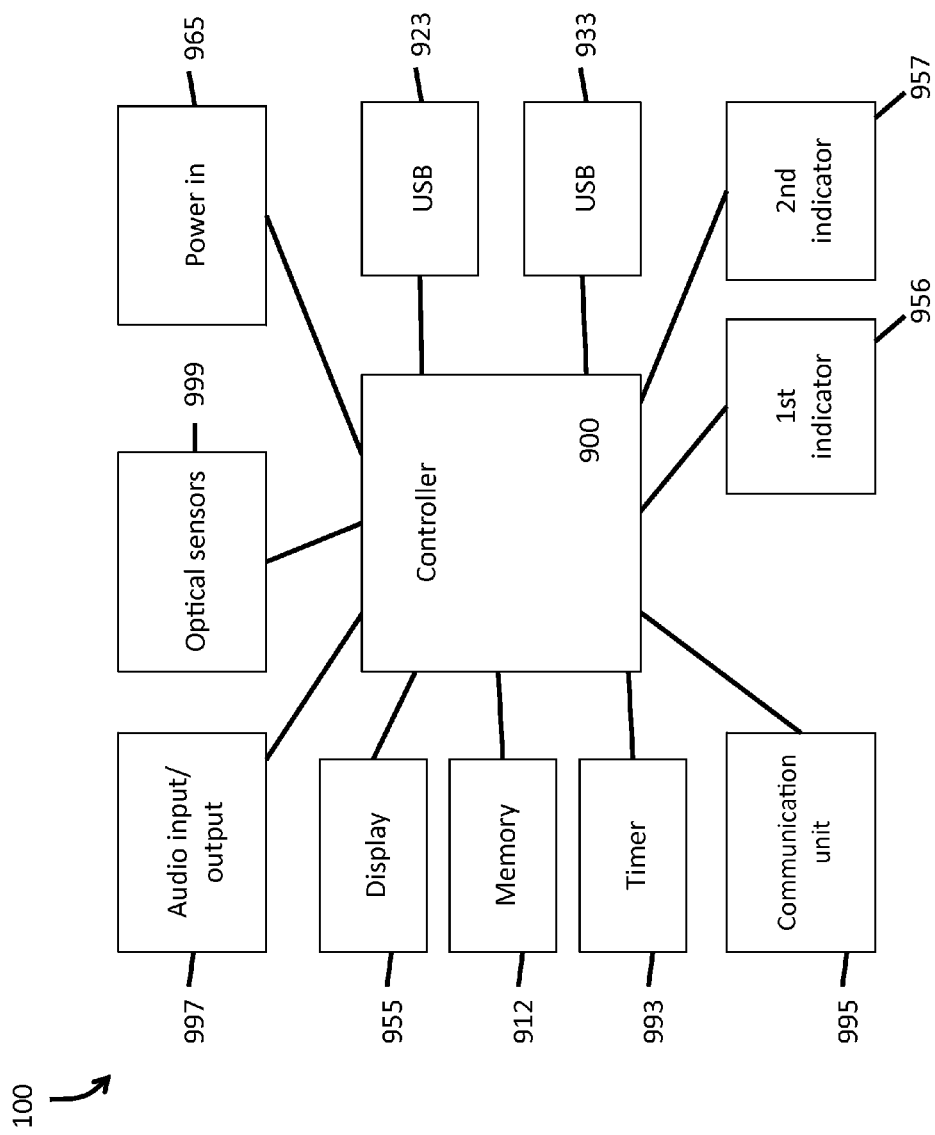
FIG. 9 is a block diagram of the device cradle according to aspects of the present invention.

FIG. 9 is a block diagram of the device cradle according to aspects of the present invention. A device cradle 100 includes connection ports 923 and 933, a display 955, indicators 956 and 957, a power connection port 965, a communication transceiver 995, a memory 912, and a controller 900. The device cradle 100 may further include timer 993, audio input/output 997, and at least one device sensor 999.

The connection ports 923 and 933 may correspond and include features similar to those described herein with respect to the first slot connection port 123 and the second slot connection port 133. The connection ports 923 and 933 may each be, independently, one of a universal serial bus (USB) port, a mini-USB port, or any connection capable of connection, communication, and/or power supply or the like. Control and monitoring of the connection ports 923 and 933 are provided by the controller 900. For example, the connection ports 923 and 933 may be connected to the controller 900 via at least one current sensor to monitor whether a device, for example, the first device 121 and/or the second device 131, is connected to at least one of the connection ports 923 and 933. When at least one of the first device 121 and the second device 131 is connected to at least one of the connection ports 923 and 933, for example, via first device connector 122 and the second device connector 132, the connected first device 121 and the second device 131 may draw current, which is sensed via the at least one current sensor such that the controller 900 determines that the at least one of the first device 121 and the second device 131 is connected. The controller 900 may control a condition of the first device 121 and/or the second device 131 via the at least one of the connection ports 923 and 933. For example, the controller 900 may control charging of the first device 121 and/or the second device 131 and/or data communication with the first device 121 and/or the second device 131. The controller 900 may further record the condition of the first device 121 and/or the second device 131 in a memory 912 connected to the controller 900.

The device cradle 100 includes a display 955, which may correspond to the display 155 as described herein. The display 955 may be a liquid crystal display, a light emitting diode (LED), an LED display, or the like, and may be operated under the control of the controller 900. The display 955 may display a condition of the first device 121 and/or the second device 131 as detected and/or determined by the controller 900 and/or as recorded and read from the memory 912. Further, the controller 900 may control the display 955 to cycle through various indications, for example, a condition of a first device 121 associated with the device cradle, a condition of a second device 131 associated with the device cradle, and/or modes of the device cradle 100 with respect to the first device 121 and/or the second device 131.

The device cradle 100 includes a first device indicator 956 and a second device indicator 957, which may respectively correspond to the first device indicators 156, 256, and 356 and the second device indicators 157, 257, and 357 as described herein. The first device indicator 956 and the second device indicator 957 may indicate a condition of the respective first device 121 and the second device 131. The various conditions of the first device 121 and the second device 131 and/or modes of the device cradle 100 may be indicated by the first device indicator 956 and the second device indicator 957 by flashing, frequency of flashing, color, brightness, and the like, and combinations thereof, under the control of the controller 900. The first device indicator 956 and the second device indicator 957 may be separate from or may be included in the display 955 to indicate a condition of the respective first device 121 and the second device 131 and/or a mode of the device cradle 100 with respect to the first device 121 and the second device 131.

The device cradle 100 includes a power connection port 965, which may correspond to the power connection port 165 as described herein and may include terminals to receive power from a standard wall outlet or terminals to receive power from one or more batteries and/or fuel cells and the like. The power input to the device cradle 100 may be controlled by the controller 900. Although not shown, a power converter may be included to convert between alternating and/or direct currents. The device cradle 100 includes a communication transceiver 995 to communicate with a network, a server, a computer, an electronic device, another device cradle 100, and the like. The communication transceiver 995 may include structures necessary for wireless and/or wired communication with various networks and/or protocols. For example, the communication transceiver 995 may include antennas and structures for communication via cellular and/or wireless telephone communication standards, Wi-Fi, Bluetooth, infrared, Ethernet, digital subscriber line (DSL), telephone, USB or micro-USB connection to a computer in a network, and the like. The controller 900 controls the communication transceiver 995 to communicate with other devices to provide information regarding a condition of the first device 121 and/or the second device 131 and/or a mode of the device cradle 100 with respect to the first device 121 and the second device 131 according to aspects described herein. The controller 900 may control the communication transceiver 995 to communicate with at least one of the first device 121 and/or the second device 131 according to aspects described herein. Further, although described herein as transceiver 995, aspects need not be limited thereto such that the transceiver 995 may be a transmitter-receiver, only a transmitter, only a receiver, and the like.

The device cradle 100 includes an audio input/output 997, which may include a speaker to emit sound and/or an audio jack to output sound to an external speaker to be emitted according to control of the controller 900. For example, according to a condition associated with one or more of the first device 120 and the second device 130, an alarm may be output via the audio input/output 997. Further, the cradle device 100 may include a radio receiver or transceiver and tuner or Internet radio functionality and control to output received sounds via the audio input/output 997.

The device cradle 100 includes at least one device sensor 999 to sense and/or detect the presence of a device in a respective slot. For example, the at least one device sensor 999 may be the first slot optical sensor 124 and/or the second slot optical sensors 134. The at least one device sensor 999 may be an optical sensor that emits and/or senses a light beam such that the breaking of the light beam indicates the presence of a device disposed in a slot. Similarly, the at least one device sensor 999 need not be an optical sensor but may be any of various sensors to detect the presence of a device in a slot of the device cradle 100, for example, contact or other switches, or any sensor to detect a pressure, an impedance, changes in impedance, magnetic field, changes in magnetic field, and the like, to indicate the presence of the device in the slot.

The device cradle 100 includes a timer 993 to increment a time associated with a device being disposed in a slot of the device cradle 100. Specifically, the timer 993 may be a timing circuit to determine or be used to determine a time of presence in or absence from a slot of the device cradle 100 of a device according to signals from the device sensors 999. The timer 993 may, for example, be implemented as a separate memory control/monitoring device, or incorporated within an existing system memory and/or controller, for example, the memory 912 and the controller 900. Further, although described as being included in the device cradle 100, aspects need not be limited thereto such that a timer may be additionally or only included in a server and/or a terminal external to the device cradle 100, for example, the server 1400 and at least one terminal 1100-1 and 1100-2. Further, aspects need not be limited thereto such that the timer 993 may be a clock with which the controller 900 may determine a time so as to implement operations according to various parameters.

The controller 900 is connected to and communicates with a memory 912 to manage and operate each of the features of the device cradle 100. For example, as described herein, the controller 900 operates and/or controls each of the connection ports 923 and 933, the display 955, the indicators 956 and 957, the power connection port 965, the communication transceiver 995, and the memory 912, and the like. The controller 900 may be a microcontroller and may be, for example, a PIC24 microcontroller programmable by a PICKIT development programmer/debugger. The memory 912 may be read and/or write, volatile/non-volatile memory of any variety in which various condition information of the first device 121 and the second device 131 may be stored. The device cradle 100 may include more than one controller 900 and/or memory 912. The controller 900 may be capable of identifying at least one of the first device 121 and the second device 131 by communicating with the first device 121 and the second device 131, respectively, via the first device connector 122 and the second device connector 132.

Figure 10:
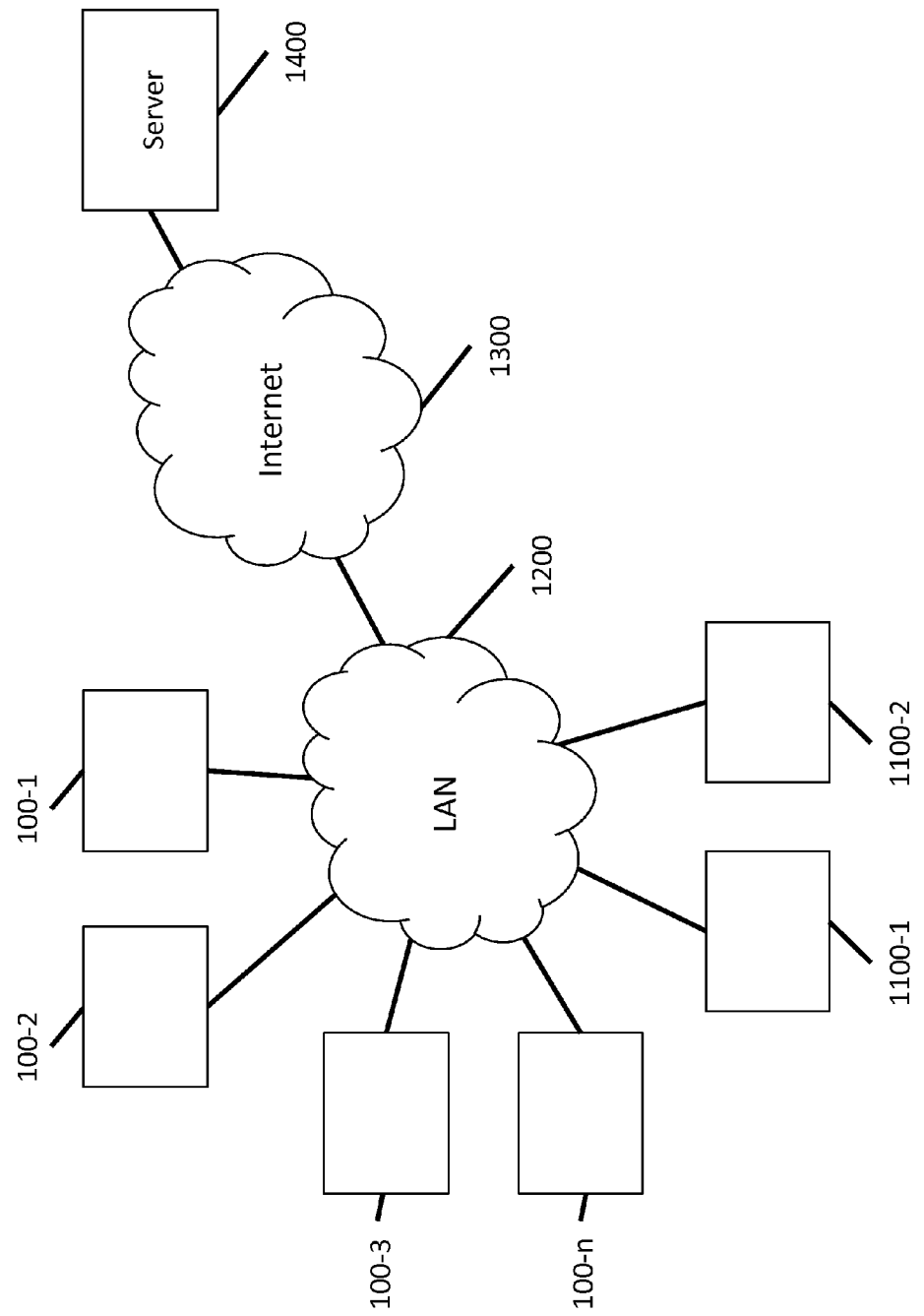
FIG. 10 illustrates a system for monitoring and controlling use of a portable electronic device including a device cradle according to aspects of the present invention.

FIG. 10 illustrates a system for monitoring and controlling use of a portable electronic device including a device cradle according to aspects of the present invention. The system includes device cradles 100-1, 100-2, 100-3, to 100-*n* connected to a local area network (LAN) 1200. The device cradles 100-1, 100-2, 100-3, to 100-*n* may each be similar to the device cradles 100, 200, and 300 as described herein. Four device cradles 100-1, 100-2, 100-3, to 100-*n* are shown in FIG. 10 (n=4). However, aspects need not be limited thereto such that more or fewer device cradles 100-1, 100-2, 100-3, to 100-*n* may be included in the system. For example, only one device cradle 100-1 may be included (n=1). Similarly, two or three or more device cradles 100-1, 100-2, 100-3, to 100-*n* may be present and connected to the LAN 1200 (n=2, 3, or more).

The LAN 1200 may support both wired and wireless connections and may be one or more conventional LANs. Similarly, the device cradles 100-1, 100-2, 100-3, to 100-*n* as well as terminals 1100-1 and 1100-2 may communicate with each other via the LAN 1200 and/or the Internet 1300. Moreover, the device cradles 100-1, 100-2, 100-3, to 100-*n* and the terminals 1100-1 and 1100-2 may communicate with a server 1400 via the LAN 1200 and/or the Internet 1300 to manage, monitor, and police use of portable electronic devices associated with each of the device cradles 100-1, 100-2, 100-3, to 100-*n*.

The terminals 1100-1 and 1100-2 include processors and memory sufficient to operate and control usage settings for at least one of the device cradles 100-1, 100-2, 100-3, to 100-*n*, and at least one portable electronic device associated therewith, in accordance with aspects of the present invention. The terminals 1100-1 and 1100-2 may each be, independently, a smartphone, a tablet computer, a laptop computer, a desktop computer, a wearable device, or the like, and may include programming or be programmed to communicate with and/or control at least one of the device cradles 100-1, 100-2, 100-3, to 100-*n*, and/or a portable electronic device associated therewith as described herein. Although only illustrated as being two, aspects need not be limited thereto such that more or fewer than the terminals 1100-1 and 1100-2 may be provided, for example, only one of the terminals 1100-1 and 1100-2 may be provided or more than the two terminals 1100-1 and 1100-2 may be provided.

The server 1400 includes at least one processor and at least one memory sufficient to operate and control usage settings for at least one of the device cradles 100-1, 100-2, 100-3, to 100-*n*, and at least one portable electronic device associated therewith, in accordance with aspects of the present invention. The server 1400 may manage traffic, information, commands, and synchronization of the device cradles 100-1, 100-2, 100-3, to 100-*n*, and at least one portable electronic device associated therewith, and the at least one terminal 1100-1 and 1100-2. The server 1400 may be a telephone, a computer connected inside or outside of the LAN 1200, another device cradle, a mobile terminal, e.g., terminal 1100-1, or the like. Further, the server 1400 may store data collected by the device cradle 100, such as historical usage data, overage time, reward time, daily reports, weekly reports, monthly reports, and the like. The server 1400 may further compare usage data from among the various devices associated with the device cradle 100 to all or some of the devices associated with other device cradles inside one home or across the country or the world according to various settings and requested data. The server 1400 may store usage settings as provided by at least one of the terminals 1100-1 and 1100-2, for example, park time, available usage time, screen time, reward time, daily or weekly schedule, and the like. However, aspects need not be limited thereto such that such data may be redundantly or only stored and accessed in at least one of the device cradles 100-1, 100-2, 100-3, to 100-*n* and the terminals 1100-1 and 1100-2. The server 1400 may be connected to the system via the Internet 1300, the LAN 1200, at least one of the terminals 1100-1 and 1100-2, at least one of the first device 121 and the second device 131, and the device cradle 100, and multiple servers 1400 may be present and connected to the system.

The system provides for customizable monitoring and management of each of the devices, for example, the first device 121 and the second device 131, associated with each slot, for the example, the first slot 120 and the second slot 130 of the device cradle 100. For example, each of the terminals 1100-1 and 1100-2 may operate to control the device cradle 100-1, 100-2, 100-3, to 100-*n* via the server 1400, the Internet 1300, and the LAN 1200.

Although this description applies to plural devices associated respectively with plural slots of plural device cradles manageable by plural devices, aspects of the present invention will be described herein with respect to the first device 121 associated with the first slot 120, the second device 131 associated with the second slot 130, and the device cradle 100 as managed by the terminal 1100-1.

The terminal 1100-1 provides an application through which usage of the first device 121 and the second device 131 are monitored and controlled in conjunction with the device cradle 100. The terminal 1100-1 controls operation of the device cradle 100, the first device 121, and the second device 131 by setting at least one parameter. The first parameter may be a time in which the device is required to be disposed in and/or required to be connected to the device cradle. The first parameter may be a length of time the first device 121 must be disposed in the first slot 120 within a day or other time period, for example, the first device must be disposed in the first slot 120 for 22 hours of a day. The first parameter may be at least one time period in which the first device 121 must be disposed in the first slot 120, for example, the first device must be disposed in the first slot 120 from 5 pm to 7 pm. The first parameter may be a length of time the first device 121 must be connected via the first device connector 122 to the device cradle 100, for example, the first device must be connected via the first device connector 122 to the device cradle 100 for 22 hours of a day. The first parameter may be at least one time period in which the first device 121 must be connected via the first device connector 122 to the device cradle 100, for example, the first device must be connected via the first device connector 122 to the device cradle 100 from 5 pm to 7 pm.

As described herein, "park time" refers to time or a time period in which a device must be disposed or parked in a slot of the device cradle, must be connected to the device cradle via the device connector, or both disposed in the slot of the device cradle and connected to the device cradle via the device connector.

Although the first parameter is described as requiring the device to be disposed in a slot of the device cradle and/or connected to the device cradle, aspects need not be limited thereto such that times and/or time periods in which the device may be removed and/or disconnected from the device cradle may be set and determined by the at least one terminal. For example, the first parameter may be a length of time the first device 121 may be removed from the first slot 120 within a day or other time period, for example, the first device may be removed from the first slot 120 for 120 minutes in a day. The first parameter may be at least one time period in which the first device 121 may be removed from the first slot 120, for example, the first device 120 may be removed from the first slot 120 from 7 pm to 9 pm. The first parameter may be a length of time the first device 121 may be disconnected from the first device connector 122 of the device cradle 100 within a day or other time period, for example, the first device may be disconnected from the first device connector 122 of the device cradle 100 for 120 minutes in a day. The first parameter may be at least one time period in which the first device 121 may be disconnected from the first device connector 122 of the device cradle 100, for example, the first device 121 may be disconnected from the first device connector 122 of the device cradle 100 from 7 pm to 9 pm.

"Available screen time" refers to time or a time period in which a device may be removed from the slot of the device cradle, may be disconnected from the device connector of the device cradle, or both removed from the slot of the device cradle and disconnected from the device connector of the device cradle.

The times and the requirements of the park time and/or available screen time may be set and determined by at least one terminal and may be communicated to the device cradle via at least one of the at least one terminal, the device, the server, the internet, the LAN, and the like. The times and the requirements of the park time and/or the available screen time may be stored in the device cradle, the device, the terminal, the server, or the like. The device cradle may include buttons for inputting the times and the requirements of the park time and/or available screen time, and the server may control or determine the times and the requirements of the park time and/or available screen time according to, for example, default settings that may be selectable by the terminal and/or cradle.

If the first device 121 is not parked in the slot 120 during the time indicated by the first parameter or exceeds the time during which the first device 121 may be removed from the first slot 120, at least one of the first device 121, the device cradle 100, and at least one of the terminals 1100-1 and 1100-2 may perform an operation. For example, the operation performed may be an audible indicator, a visual indicator, a tactile indicator, an operation to prevent use of the first device 121, or the like, and combinations thereof.

Figure 11:
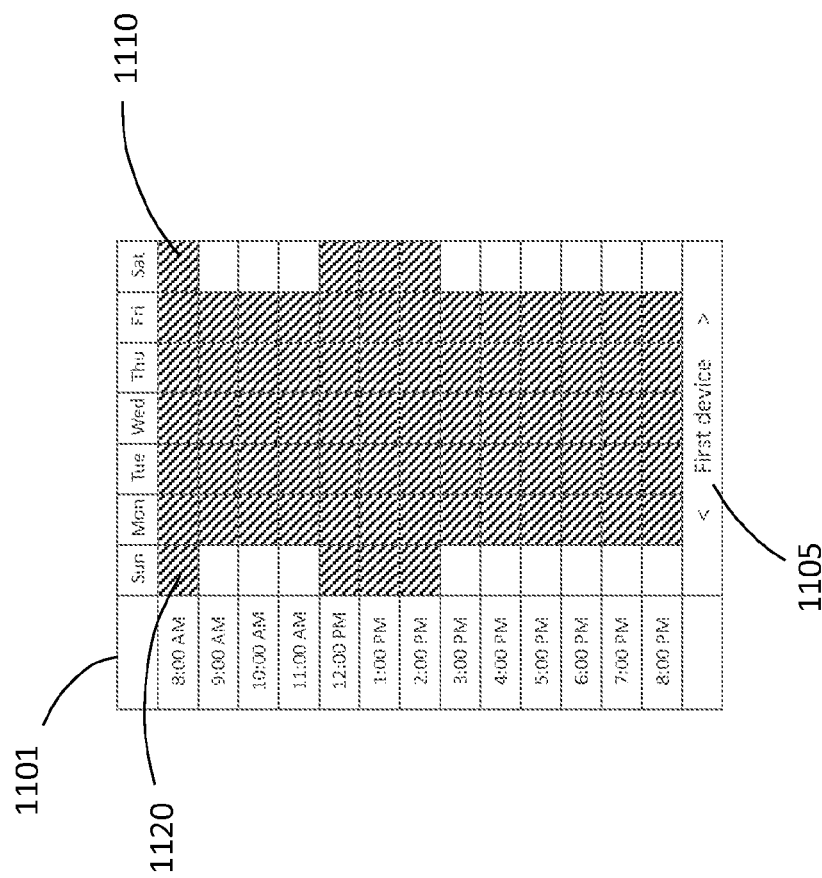
FIG. 11 is a device scheduler according to aspects of the present invention.

FIG. 11 is a device scheduler according to aspects of the present invention. A device scheduler 1101 may be an application implemented on at least one of the first device 121, the second device 131, at least one of the terminals 1100-1 and 1100-2, and/or on the server 1400 and accessed via at least one of the first device 121 and/or at least one of the terminals 1100-1 and 1100-2. As shown in FIG. 11, a scheduler 1101 may provide a selection and setting of a first parameter for implementing control over a device associated with a device cradle 100. For example, in the scheduler 1101, times and days for park time and available screen time associated with a device may be controlled and set.

Each of the first slot 120 and the second slot 130 and the associated respective first device 121 and the second device 131 may be programmed or scheduled by an individual schedule via the scheduler 1101 or one schedule provided in the scheduler 1101 may be applied to more than one or all slots and associated devices of the device cradle 100. The schedule may be repeatable according to time, for example, hour, day, week, month, etc. An indicator 1105 displays to which slot and/or associated device the currently open scheduler 1101 applies. As shown in FIG. 11, the indicator 1105 indicates that the displayed scheduler 1101 applies to the "First Device 121". The indicator 1105 to indicate the slots of the device cradle 100 and/or associated devices may be scrollable or selectable via swiping or selecting of a tab adjacent to the indicator 1105.

For example, as shown in FIG. 11, the 8 am hour, during breakfast, is park time 1110 as determined by the first parameter. Monday M through Friday F from 9 am to at least 9 pm are also set as park time 1110 such that the first device 121 is required to be disposed in slot 120, connected to the device connector 123, or both. Further, Sunday S and Saturday S from 12 pm to 3 pm are also set as park time 1110 so that the first device 121 is required to be disposed in slot 120, connected to the device connector 123, or both, during lunchtime. Available screen time 1120, time in which the first device 121 is available for removal and/or disconnection from the device cradle 100, is set as 9 a to 12 p and 3 pm to 9 pm on Sunday S and Saturday S as shown in FIG. 11.

The selection of park time 1110 and available screen time 1120 may be toggled between park time 1110 and available screen time 1120 by a touch of a screen of at least one of the terminals 1100-1 and 1100-2, or similar selection. For example, a touch, a swipe, an extended touch, a click, and the like may be used to select or toggle between a park time 1110 and an available screen time 1120.

Although times are shown in increments of 1 hour per day, aspects need not be limited thereto such that times may be incremented in seconds, minutes, hours, days, etc., and may be represented with respect to days, weeks, months, etc.

Further, the first parameter may be applicable to one slot or one device associated with the one slot or may be applicable to one or more slots of one or more device cradles. For example, the first parameter may be applied to control a first slot of a first device cradle and a first slot of a second device cradle, or first and second slots of a first device cradle and a first slot of a second device cradle and the like.

The terminal 1100-1 may control the operation of the device cradle 100, the first device 121, and the second device 131 by setting at least two parameters. Further, the at least two parameters may be applicable to one slot or one device associated with the one slot or may be applicable to one or more slots of one or more device cradles. For example, the at least two parameters may be applied to control a first slot of a first device cradle and a first slot of a second device cradle, or first and second slots of a first device cradle and a first slot of a second device cradle and the like.

The first parameter may be a time in which the device is required to be disposed in and/or required to be connected to the device cradle as described herein. The second parameter may be a total time in which the device may be removed and/or disconnected from the device cradle and may be referred to herein as a "usage time". If the usage time is set to be greater than or equal to the available screen time as described herein, the devices may be managed according to only the first parameter.

The first parameter and the second parameter may be set to control the operation of the device cradle and associated first device and second device. For example, on a Saturday, for a first device 121 associated with the first slot 120 of the device cradle 100, the first parameter may be set such that the park time is from midnight to 8 am and 8 pm to midnight and the available screen time is from 8 am to 8 pm. In such case, the second parameter may be provided to set the usage time as a total time of 120 minutes. The interaction of such settings of the first and second parameters results in the first device 120 being removable from the device cradle 100 for two hours between the times of 8 am and 8 pm. So, although the available screen time is set for 12 hours total, the usage time limits the total amount of time for which the first device 120 is available for use.

Figure 12:
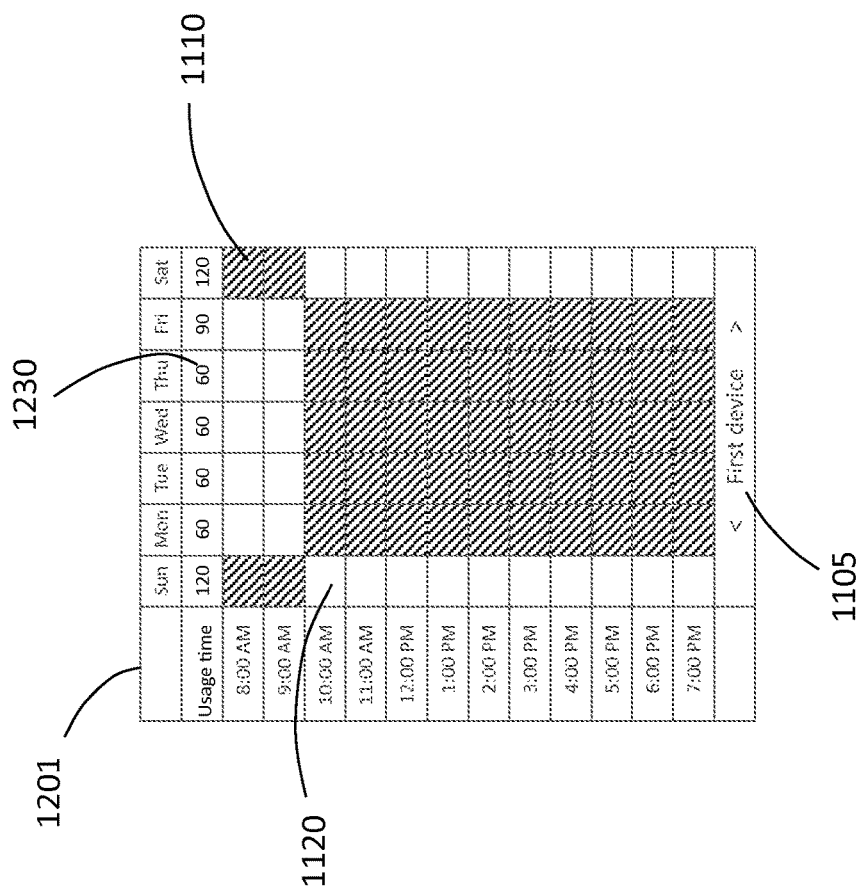
FIG. 12 is a device scheduler according to aspects of the present invention.

FIG. 12 is a device scheduler according to aspects of the present invention. Similar to as described herein, a device scheduler 1201 may be an application implemented on at least one of the first device 121, the second device 131, at least one of the terminals 1100-1 and 1100-2, and/or on the server 1400 and accessed via at least one of the first device 121 and/or at least one of the terminals 1100-1 and 1100-2. As shown in FIG. 12, a scheduler 1201 may provide a selection and setting of a first parameter and a second parameter for implementing control over a device associated with a device cradle 100. For example, in the scheduler 1201, times and days for park time 1110, available screen time 1120, and usage time 1230 associated with a device may be controlled and set. Similar to as shown in FIG. 11, a park time 1110 and an available screen time 1120 may be controlled and set as the first parameter for the first device 121 as indicated by the indicator 1105. As shown in FIG. 12, the usage time 1230 is set as 120 minutes for Sunday S, 60 minutes for Monday M, Tuesday T, Wednesday W, and Thursday T, 90 minutes for Friday F, and 120 minutes for Saturday S. The usage time 1230 may be set individually or as a group of days by selecting one or more days or usage times 1230 in response to which, for example, a scroll wheel or entry pad is displayed for usage time 1230 selection. However, aspects need not be limited thereto such that usage time 1230 selection may be accomplished by other selection methods.

Referring to FIG. 12, upon selection of the park time 1110, the available screen time 1120, and the usage time 1230, the first device 121 is available for use or removal from the device cradle 100 during the available screen time 1120 for a total of time equal to the usage time 1230. For example, on Sunday S, park time 1110 is set from 8 am to 10 am, and available screen time is set from 10 am to 8 pm. Assuming, for this example, that park time 1110 is additionally set from 8 pm to 12 am Monday M, the first device 121 is available for removal from the device cradle 100 during the available screen time 1120 from 10 am to 8 pm for a usage time 1230 of 120 minutes.

A priority among the first parameter and the second parameter may be controlled from at least one of the first device 121, the second device 131, at least one of the terminals 1100-1 and 1100-2, and/or on the server 1400. In the previous example regarding FIG. 12, a first parameter priority may be set, for example, if the remaining amount of available screen time 1120 is less than the remaining amount of usage time 1230 for the day, the available screen time 1120 may have priority such that park time 1110 begins and the first device 121 is required to be disposed in the slot 120 and/or connected to the device connector 122 at the expiration of the available screen time 1120 even though not all of the usage time 1230 was used. In the case of unused usage time 1230, the remaining usage time 1230 may be rolled over to and available on the next day to be used during available screen time 1120. For example, if 15 minutes of usage time 1230 remained upon expiration of the available screen time 1120 on Sunday S, the 15 minutes may be applied to the 60 minutes usage time 1230 of Monday M so that Monday's M available usage time 1230 would be 75 minutes. However, aspects need not be limited thereto such that unused usage time 1230 may be canceled or lost. Further, any overage time, or time in which the device required to be parked or disposed in the associated slot and/or connected to the device cradle, may be subtracted from the next day's usage time 1230.

A second parameter priority may be set, for example, if the remaining amount of available screen time 1120 is less than the remaining amount of usage time 1230 for the day, the usage time 1230 may have priority such that the available screen time 1120 may be extend to expire upon expiration of the usage time 1230, at which point park time 1110 begins and the first device 121 is required to be disposed in the slot 120 and/or connected to the device connector 122.

The usage time 1230 does not need to be used in one usage session but may be spread throughout the available screen time 1120. For example, in FIG. 12, on Sunday S, the first device 121 may be removed and disconnected from the device cradle 100 from 10 am until 11 am, at which point the first device 121 is disposed in the first slot 120 and/or connected to the first device connector 122 at 11 am, thereby using 60 minutes of the 120 minutes of usage time 1230 for Sunday S. Then, at 12 pm, the first device 121 may be removed and disconnected from the cradle 100 until 1 pm, at which time the usage time 1230 expires, park time 1110 automatically begins even though available screen time 1120 is still available, and the first device 121 is required to be disposed in the first slot 120 and/or connected to the first device connector 122.

In general, the usage time 1230 should be less than the available screen time 1120 such that if a usage time 1230 greater than the available screen time 1120 is set, an error may be indicated on at least one of the device cradle 100, the first device 121, the second device 131, at least one of the terminals 1100-1 and 1100-2, and the server 1400. However, aspects need not be limited thereto such that the device scheduler 1201 may prevent such incompatible settings of the park time 1110, the available screen time 1120, and the usage time 1230.

Further, the park time 1110, the available screen time 1120, and the usage time 1230 may be reset or reconciled at 12 am each day or another time according to a setting by at least one of the device cradle 100, the first device 121, the second device 131, at least one of the terminals 1100-1 and 1100-2, and the server 1400.

Although FIGS. 11 and 12 indicate device schedulers 1101 and 1201, the schedulers 1101 and 1201 may set schedules for multiple slots of the device cradle 100 and associated devices in the aggregate according to, for example, a user. For example, child A may use the first device 121 and the second device 131 while child B may use a third device and a fourth device. The schedulers 1101 and 1201 may set schedules for child A's use of both the first device 121 and the second device 131. For example, the removal and disconnection of the first device 121 from the first slot 120 of the device cradle 100 and the removal and disconnection of the second device 131 from the first slot 130 of the device cradle 100 may both count against the set usage time 1230 for child A. When more than one device is removed and disconnected from the device cradle 100, the usage time 1230 may be incremented according to the time the more than one device is removed and disconnected or may be incremented by a multiplier equal to the number of devices removed and disconnected. For example, if the usage time 1230 for a day is 120 minutes and two devices are removed and disconnected from the device cradle 100, the usage time 1230 may be incremented twice as fast as normal time such that the usage time 1230 may last for only 60 minutes.

Notifications, alarms, and/or status may be provided upon the occurrence of various events. Notifications and/or alarms may be provided by at least one of the first device 121, the second device 131, at least one of the terminals 1100-1 and 1100-2, the device cradle 100, and the server 1400. For example, upon removal and/or disconnection of the first device 121 from the first slot 120 of the device cradle 100 during park time 1110 or available screen time 1120, a notification indicating that the first device 121 has been removed and/or disconnected from the device cradle 100 can be sent via email, text, or an application to at least one of the terminals 1100-1 and 1100-2. Disconnection of the device cradle 100 from the Internet 1200, the LAN 1300, of the server 1400 may be provided in a notification to at least one of the first device 121, the second device 131, at least one of the terminals 1100-1 and 1100-2, the device cradle 100, and the server 1400. Further, upon an expiration of an available screen time or a usage time, or if one of the first device 121 and the second device 131 is not disposed in the respective first slot 120 and the second slot 130 in a park time, a notification, alarm, or status may be displayed on a screen of one of the first device 121 and the second device 131 to inform a user of such information.

Further, via an application on the at least one of the terminals 1100-1 and 1100-2 or via the internet, the status of at least one of the first device 121 and the second device 131 may be inspected and a status of at least one of the first device 121 and the second device 131 may be displayed. For example, whether the at least one of the first device 121 and the second device 131 is charging via the device cradle 100, is disposed in the associate slot of the device 100, and the like, may be displayed as a status of the at least one of the first device 121 and the second device 131.

Figure 13:
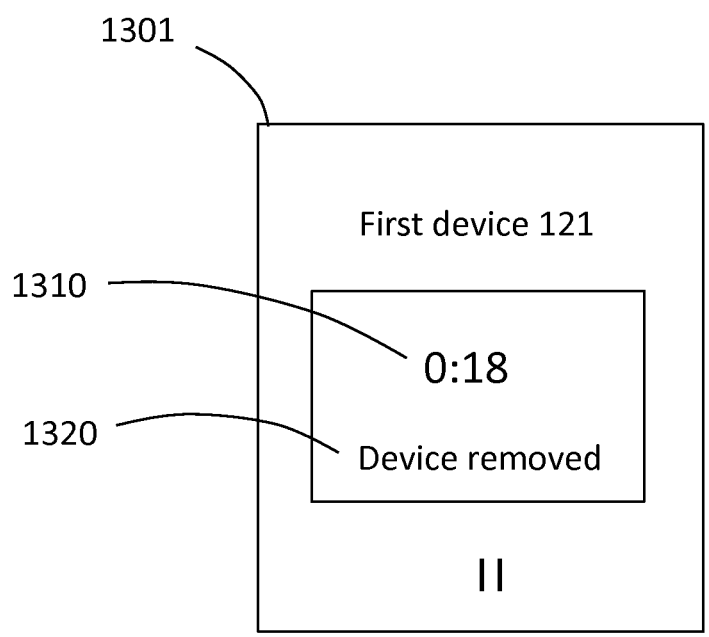
FIG. 13 is a display of a terminal indicating the status of a device according to aspects of the invention.

FIG. 13 is a display of a terminal indicating the status of a device according to aspects of the invention. For example, if the first device 121 is removed and disconnected, a status display 1301 displays an amount 1310 of available screen time 1120 and/or usage time 1230 remaining as well as the status 1320 of the device as shown in FIG. 13.

Figure 14:
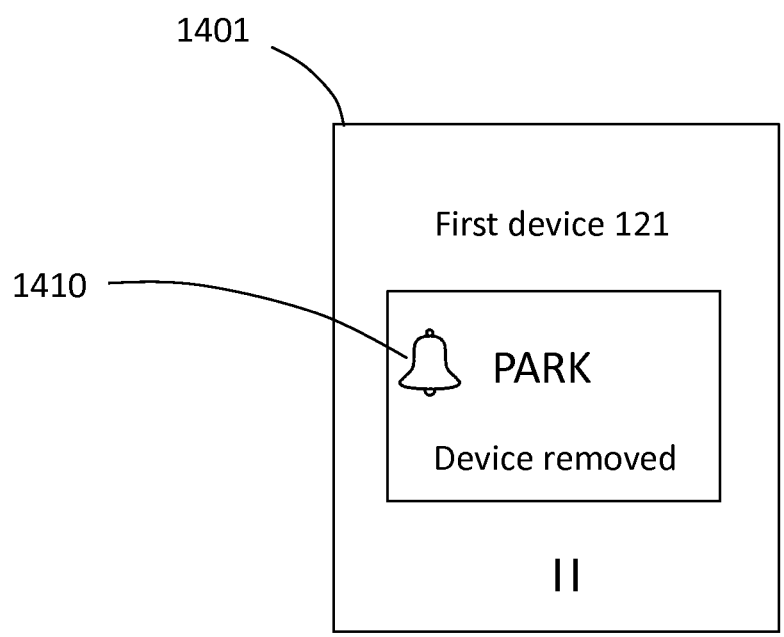
FIG. 14 is a display of a terminal indicating the status of a device according to aspects of the invention.

FIG. 14 is a display of a terminal indicating the status of a device according to aspects of the invention. The status of a device may also include indications of other information, for example, whether an alarm is sounding or active but silenced. For example, as shown in FIG. 14, a status display 1401 shows that the park time 1110 for the first device 121 has started and the first device 121 is not disposed in the slot 120 and/or connected to the first device connector 122. As such, "PARK" is displayed as the status of the first device 121, and an indicator 1410 is displayed to indicate that an alarm is sounding and is being generated by the device cradle 100. The alarm emitted by the device cradle 100 may be selectable for each slot and/or associated device. Further, whether notifications, alarms, and/or statuses are provided and to what device such are provided may also be selectable according to the device or groups of devices.

Figure 15:
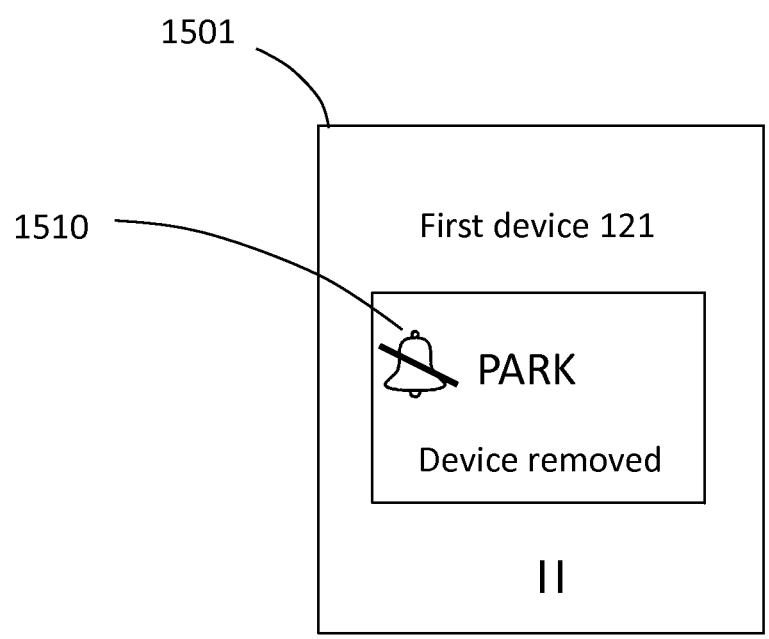
FIG. 15 is a display of a terminal indicating the status of a device according to aspects of the invention.

The notifications and/or alarms may be silenced via operation of at least one of the first device 121, the second device 131, at least one of the terminals 1100-1 and 1100-2, and the server 1400. For example, an alarm may be silenced by selecting an indicator 1410 that is displayed to indicate that an alarm is sounding or the alarm may be silenced by pressing of a physical button on the device cradle 100. FIG. 15 is a display of a terminal indicating the status of a device according to aspects of the invention. The status of a device may also include indications of other information, for example, whether an alarm is sounding or active but silenced. For example, as shown in FIG. 15, a status display 1501 shows that the park time 1110 for the first device 121 has started and the first device 121 is not disposed in the slot 120 and/or connected to the first device connector 122. As such, "PARK" is displayed as the status of the first device 121, and an indicator 1510 is displayed to indicate that an alarm is active but muted.

Similarly, the device cradle 100 may display statuses associated with each of the slots and/or devices thereof. For example, in FIG. 2, the display 155 indicates an available screen time 1120 and/or usage time 1230 remaining until park time 1110 begins for the first device 121 as indicated by the marker 156a. The device cradle 100 may display the available screen time 1120 and/or usage time 1230 remaining until park time 1110 even while the first device 121 is disposed in the slot 120 and connected to the device cradle 100 via the first device connector 122. Further, the display 155 may toggle between the statuses of the first device 121 and the second device 131.

Upon expiration of one or both of the available screen time 1120 and the usage time 1230, according to settings, or upon beginning of the park time 1110, a device is required to be disposed in its associated slot in the device cradle and/or connected to the device connector of the device cradle. Notifications and/or alarms indicating that park time 1110 has started may be provided. For example, the display 155 of the device cradle 100 may display "PARK" so as to indicate that park time 1110 has begun for at least one device associated with the device cradle 100.

Further, the system may provide warnings of the approaching expiration of one or both of the available screen time 1120 and the usage time 1230, according to settings, or upon beginning of the park time 1110. For example, the device cradle 100 may emit a sound or alarm indicating that the remaining amount of the available screen time 1120 and/or the usage time 1230 is below a threshold, for example, 15 minutes, and the device cradle 100 may emit a sound every 10 seconds during the last 2 minutes of available screen time 1120 and/or the usage time 1230. A message may be displayed upon at least one of the first device 121 and the second device 131 and such device may be disabled upon expiration of the available screen time 1120 and/or the usage time 1230. The device cradle 100 may display green, yellow, and red lights associated with each slot according to the remaining amount of the available screen time 1120 and/or the usage time 1230. For example, when the remaining amount of the available screen time 1120 and/or the usage time 1230 is below a threshold, for example 15 minutes, the device cradle 100 may change an indicator, for example, the first indicator 256, from green to yellow. Upon starting of the park time 1110, the indicator may be changed from yellow to red to indicate that the first device 121 is required to be disposed in the first slot 120 and/or connected to the first device connector 122.

Figure 16:
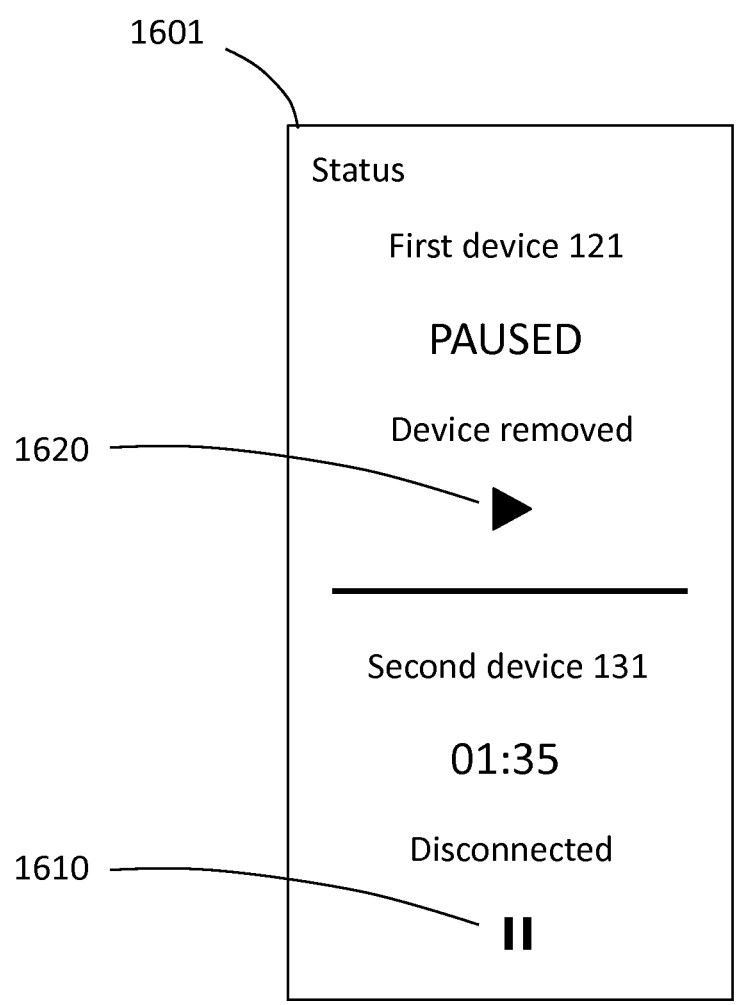
FIG. 16 is a display of a terminal indicating the status of a device according to aspects of the invention.

FIG. 16 is a display of a terminal indicating the status of a device according to aspects of the invention. Each of the park time 1110, the available screen time 1120, and/or the usage time 1230 may be paused at any time. The pause mode allows for the device, for example, the first device 121 to be removed and/or disconnected from the device cradle 100 without decreasing the amount of usage time 1230 remaining or the first device 121 to be removed and/or disconnected from the device cradle 100 without an alarm sounding. As shown in FIG. 16, a status display 1601 allows for a pause mode to be started by selection of the pause icon 1610 and ended by selection of the resume icon 1620. The pause icon 1610 and the resume icon 1620 further indicate the status of the respective devices. Further, the device cradle 100 may display "PAUS" or "PAUSE" on the display 155 so as to indicate that at least one of the devices associated with the device cradle 100 may be in pause mode.

Figure 17:
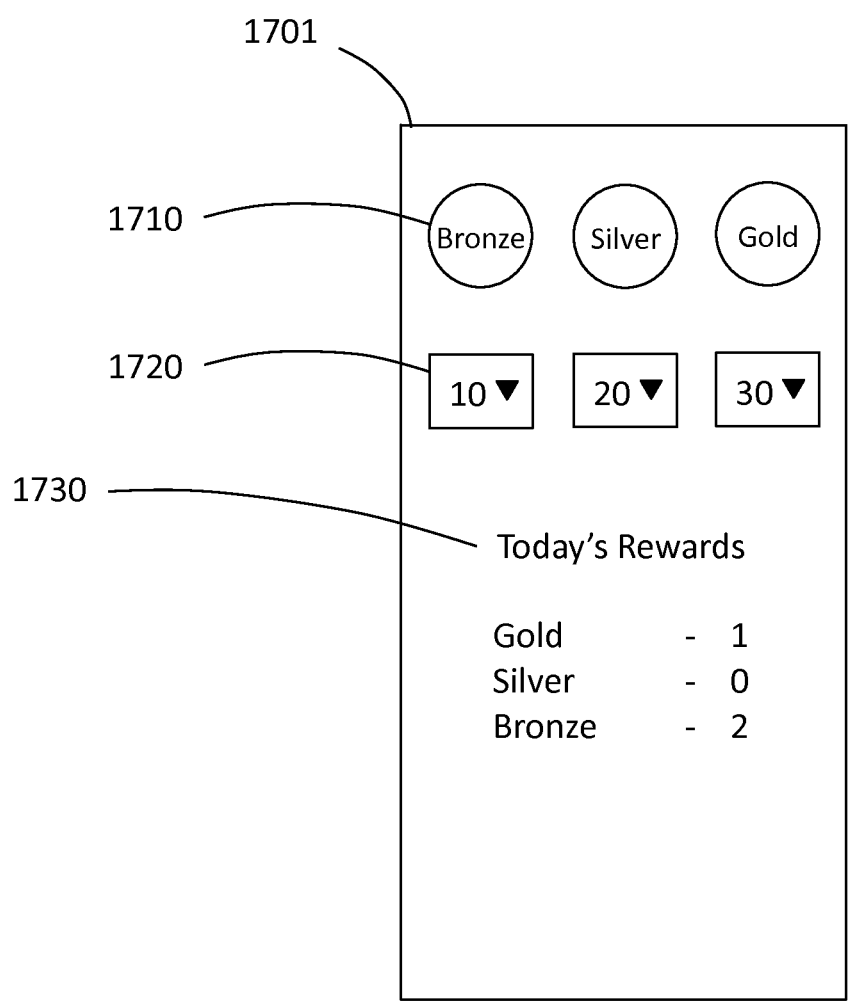
FIG. 17 shows a reward screen according to aspects of the present invention.

The park time 1110, the available screen time 1120, and the usage time 1230 may be updated or modified in various ways, for example, to encourage good behavior of a user. For example, rewards of various levels associated with a set amount of additional time may be provided. FIG. 17 shows a reward screen according to aspects of the present invention. Reward screen 1701 provides various awards 1710 with a selectable amount of additional time 1720 to be provided to at least one of the first device 121 and the second device 131. For example, a gold reward 1710 may be worth an additional 30 minutes of usage time 1230. The amount of additional time 1720 to be added to the usage time 1230 may be selectable. Further, a listing of rewards 1730 may be provided. Whether the additional time 1720 will be extendable beyond the starting of the park time 1110 may be determined according to the priority setting among the first and second parameters as discussed herein. Similarly, time may be subtracted from the usage time to discourage negative behavior.

Figure 18:
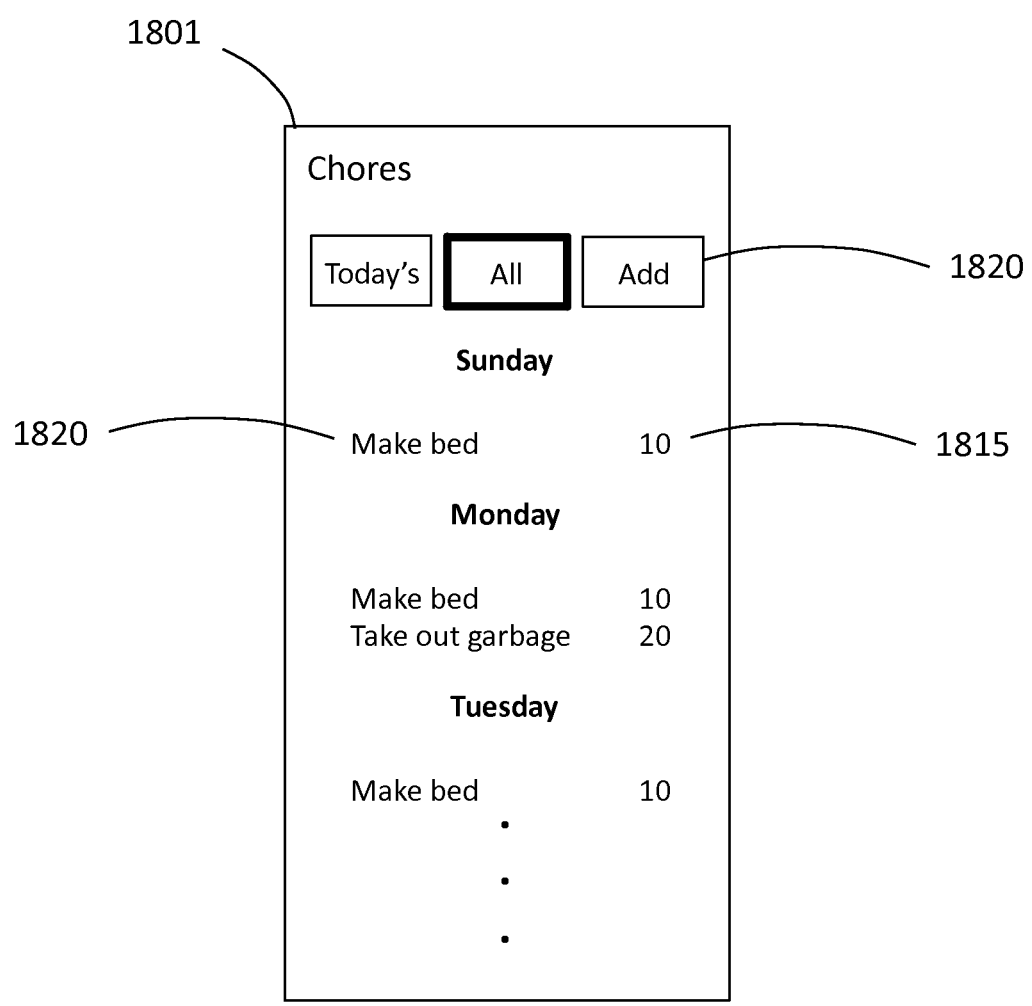
FIG. 18 shows a chores screen according to aspects of the present invention.

Similarly, rewards or benefits may be provided in accordance with expected or encouraged behaviors. FIG. 18 shows a chores screen according to aspects of the present invention. As shown in FIG. 18, all chores may for at least one of the first device 121 and the second device 131 may be displayed. For example, on Sunday, Monday, and Tuesday, the chore 1810 "make bed" is shown with an additional time value 1815 of "10" minutes indicating that if the chore 1810 of making the bed is completed and entered, then 10 minutes will be added to the usage time for the at least one of the first device 121 and the second device 131. Various chores 1810 may have different additional time values 1815. For example, the chore 1810 of "take out garbage" on Monday is associated with an additional time value 1815 of "20" minutes. Chores 1810 may be displayed according to day, device, or all chores associated with the devices associated with the device cradle 100.

Figure 19:
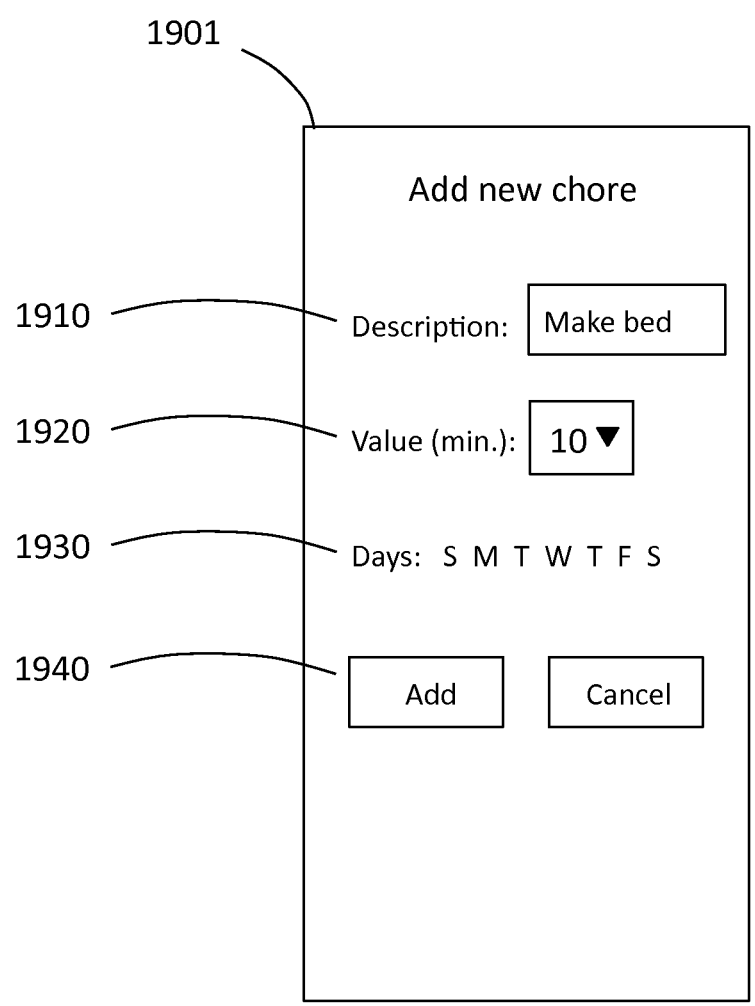
FIG. 19 is an add new chore screen according to aspects of the present invention.

An additional chore 1810 may be added and set up upon selection of the "Add" button 1820. FIG. 19 is an add new chore screen according to aspects of the present invention. FIG. 19 shows an add new chore screen 1901 in which a description 1910 of the chore, a value of the additional time value 1815, and a day on which the chore is to be performed 1930 is provided. The specified chore may be added upon selection of the "Add" button 1940.

Figure 20:
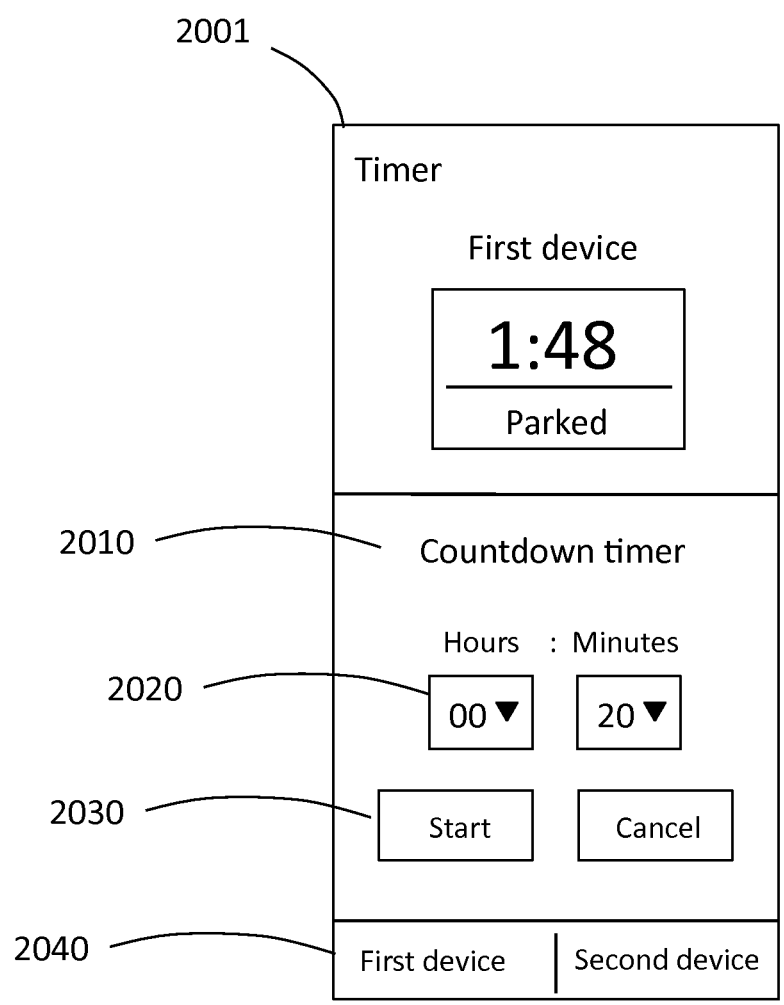
FIG. 20 is a countdown timer setting screen according to aspects of the present invention.

At least one of the terminals 1100-1 and 1100-2 may operate a countdown timer independent of the device cradle 100, for example, if a device is loaned to a user. FIG. 20 is a countdown timer setting screen according to aspects of the present invention. In the countdown timer setting screen 2001, the first device 121 and the second device 131 are selectable via a device listing 2040. The device listing 2040 may be a user listing, which may account for all devices associated with a user, but aspects need not be limited thereto. Upon selecting a device from among the devices listed in the device listing 2040, a status of the selected device is displayed. For example, the status of the first device 121 is displayed in FIG. 20. A time 2020 for the countdown timer 2010 is selectable according to dropdown menus. However, aspects need not be limited thereto such that scroll wheels, or the like, or boxes for time input, or the like, may be included. To start the countdown timer 2010, the start button 2030 is selected. Pre-defined time increments, for example, 10, 20, 30, 40, 50, 60, 80, 100, 120, and 180 minutes, may be provided in selecting a time 2020.

Figure 21:
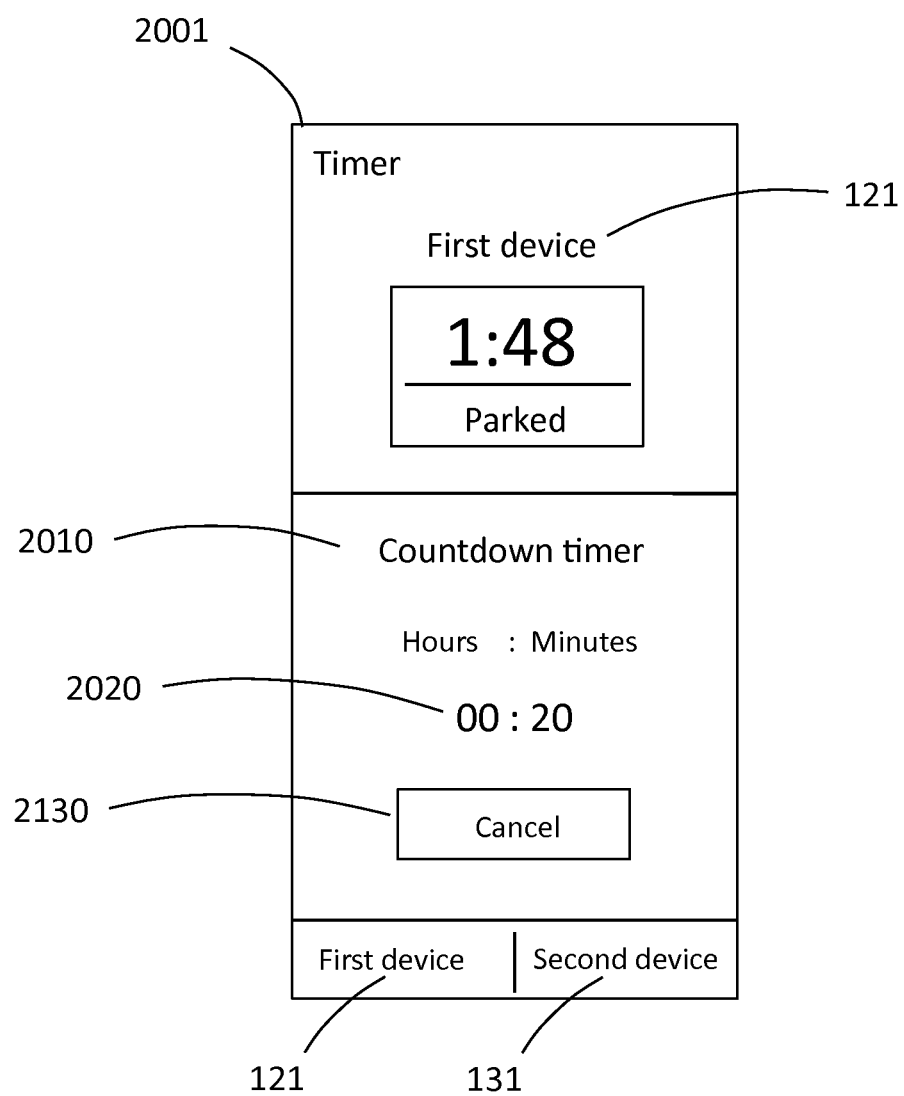
FIG. 21 is a countdown timer display screen according to aspects of the present invention.

FIG. 21 is a countdown timer display screen according to aspects of the present invention. A countdown timer display screen 2101 is provided which displays the current status of the selected device, for example, the first device 121, and the status of the countdown timer 2010. For example, a time 2020 of 20 minutes is shown to remain in the countdown timer 2010. A cancel button 2130 may be provided to cancel the countdown timer 2010 and resume normal operation of the device cradle 100 and system. The countdown timer 2010 may operate to decrease a remaining amount of usage time 1230 or may operate independently from the usage time 1230. Expiration of the time 2020 of the countdown timer 2010 may result in a notification and/or alarm being provided similar to the expiration of the available screen time 1120.

FIG. 22 illustrates a method of operation of the device cradle according to aspects of the present invention. In operation 2202, a first parameter is determined. The first parameter may be a time in which the device is required to be disposed in and/or required to be connected to the device cradle. The first parameter may be input to at least one of the device cradle, the terminal, and the server, and may be communicated to at least one of the device cradle, the terminal, and the server. The first parameter may define park time and available screen time as described herein.

In operation 2204, a second parameter is determined. The second parameter may be a total time in which the device may be removed and/or disconnected from the device cradle and may be referred to herein as a "usage time". The second parameter may be input to at least one of the device cradle, the terminal, and the server, and may be communicated to at least one of the device cradle, the terminal, and the server.

In operation 2206, a status of a device associated with a slot of the device cradle is determined. At least one of the device cradle, the terminal, and the server may determine a location status of the device indicating whether a device is disposed in a slot of the device cradle and/or a connection status of the device indicating whether the device is connected to the device cradle via a device connector. For example, as described with respect to FIG. 7, the device cradle may include a sensor to detect the presence of a device in a slot of the device cradle. The device cradle may include a device connector through which data and/or power are communicable with the device so as to determine whether the device is connected to the device cradle. The status of the device in the device cradle may be, for example, not disposed in the slot and not connected to the device connector, disposed in the slot but not connected to the device connector, not disposed in the slot but connected to the device connector, or disposed in the slot and connected to the device connector.

In operation 2208, the status of at least one of the first parameter and the second parameter is determined. For example, at least one of the device cradle, the terminal, and the server may monitor and/or determine the time or a time period associated with at least one of the first parameter and the second parameter. For example, the device cradle, via the controller, may determine that the current time is such that the park time as determined by the first parameter requires that the device be disposed in the device cradle. For example, at least one of the device cradle, via the controller, the terminal, and the server may determine the usage time is expired for a given time period, which results in the device being required to be disposed in the device cradle independent of any remaining available screen time. At least one of the device cradle, via the controller, the terminal, and the server may first determine the status of one of the first parameter and second parameter before determining the status of the other of the first parameter and the second parameter or may determine both simultaneously.

In operation 2210, an indication of the conditions of at least one of the device, the first parameter, and the second parameter is provided. For example, the conditions of at least one of the device, the first parameter, and the second parameter may be indicated based on at least one of the statuses of the device, the first parameter, and the second parameter. For example, if the device is not disposed in the slot, the device is not connected to the device connecter, and the current time is outside of the available screen time, at least one of the device cradle, the terminal, and the server may provide an alarm indicating the conditions of the device, i.e., that the device is not disposed in the slot or connected to the device connector and the current time is outside of the available screen time.

As another example, if the device is not disposed in the slot, the device is connected to the device connecter, and the current time is outside of the available screen time, at least one of the device cradle, the terminal, and the server may provide an alarm indicating the conditions of the device, i.e., that the device is not disposed in the slot and the current time is outside of the available screen time.

The indication of the conditions of at least one of the device the first parameter, and the second parameter may be indicated on a display or indicator of the device cradle. For example, if the first parameter indicates that the current time is outside of the available screen time or within the park time, or if the first parameter and the second parameter indicate that the current time is within the available screen time but the usage time has expired, the display of the device cradle may indicate that the device is to be disposed in a slot and/or connected to the device connector of the device cradle. For example, the display may read "PARK" and may flash. As such, the condition indicated may be a condition required of the device, i.e., the usage time has expired and the device is required to be disposed in and/or connected to the device cradle, or the condition indicated may be a current condition of the device, i.e., the usage time has expired and the device is or is not disposed in and/or connected to the device cradle.

Without limitation, the methods as described herein may be implementable in at least one of the device cradle, via controller 900, the terminal, and the server. The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level is code that may

We claim:

1. A device cradle, comprising:
   a housing comprising at least one slot in which a device is disposable;
   a sensor to detect whether a device is disposed in the slot; and
   a cable spindle disposed in the housing about which a cable connectable to the device cradle and the device associated with the at least one slot is disposable.

2. The device cradle of claim 1, wherein the sensor is an optical sensor disposed to detect whether the device is disposed in the slot.

3. The device cradle of claim 1, further comprising:
   a connection port connectable to the device disposed in the slot, the connection port to transfer at least one of power and data to the device.

4. The device cradle of claim 1, further comprising:
   a controller to monitor the device according to a status of the device and at least one parameter.

5. The device cradle of claim 4, wherein the status of the device is at least one of a location status indicating whether the device is disposed in a slot of the device cradle and a connection status indicating whether the device is connected to a connection port of the device cradle.

6. The device cradle of claim 4, further comprising:
   a display to display a condition of the device associated with the at least one slot based on the status of the device monitored by the controller.

7. The device cradle of claim 4, further comprising:
   an audio output provided in the housing to indicate a condition of the device associated with the at least one slot based on the status of the device monitored by the controller.

8. The device cradle of claim 4, further comprising:
   an indicator provided in the housing to indicate a condition of the device associated with the at least one slot based on the status of the device monitored by the controller, the indicator being a light emitting device.

9. A device cradle, comprising:
   a housing comprising at least one slot in which a device is disposable;
   a sensor to detect whether a device is disposed in the slot;
   a controller to monitor the device according to a status of the device and at least one parameter; and
   an audio output provided in the housing to indicate a condition of the device associated with the at least one slot based on the status of the device monitored by the controller;
   wherein the audio output outputs an alarm upon expiration of a time associated with the at least one parameter for the device associated with the at least one slot.

10. A device cradle, comprising:
    a housing comprising at least one slot in which a device is disposable;
    a sensor to detect whether a device is disposed in the slot;
    a controller to monitor the device according to a status of the device and at least one parameter; and
    an indicator provided in the housing to indicate a condition of the device associated with the at least one slot based on the status of the device monitored by the controller, the indicator being a light emitting device;
    wherein the condition of the device associated with the at least one slot is that a usage time associated with the at least one parameter for the device is at least one of available and expired.

11. A device cradle, comprising:
    a housing comprising at least one slot in which a device is disposable;
    a sensor to detect whether a device is disposed in the slot;
    a controller to monitor the device according to a status of the device and at least one parameter; and
    a display to display a remaining time associated with the at least one parameter, the remaining time being a time until the device associated with the at least one slot is to be disposed in the at least one slot.

12. A system to manage a device, the system comprising:
    a device cradle comprising: a housing comprising at least one slot in which a device is disposable and a sensor to detect whether a device is disposed in the slot;
    a server connected to the device cradle; and
    a terminal to control the device cradle to monitor whether the device is disposed in the slot;
    wherein the terminal controls the device cradle to monitor the device according to a first parameter,
    wherein the first parameter determines a park time in which the device is to be disposed in a slot of the device cradle and an available screen time in which the device is removable from the slot of the device cradle.

13. The system of claim 12, wherein the terminal further controls the device cradle to monitor the device according to a second parameter.

14. A system to manage a device, the system comprising:
    a device cradle comprising: a housing comprising at least one slot in which a device is disposable and a sensor to detect whether a device is disposed in the slot;
    a server connected to the device cradle; and
    a terminal to control the device cradle to monitor whether the device is disposed in the slot;
    wherein the terminal controls the device cradle to monitor the device according to a first parameter,
    wherein the terminal further controls the device cradle to monitor the device according to a second parameter,
    wherein the first parameter determines a park time in which the device is to be disposed in a slot of the device cradle and an available screen time in which the device is removable from the slot of the device cradle, and
    wherein the second parameter determines a usage time in which the device may be removed from the slot of the device cradle.

15. The system of claim 14, wherein the usage time is less than or equal to the available screen time.

16. A method of controlling usage of a device via a device cradle, the method comprising:
    determining a first parameter, the first parameter indicating at least an available screen time and a park time;
    determining a status of the first parameter;
    determining a status of a device associated with a slot of a device cradle, the status of the device indicating at least one of whether the device is disposed in the slot and whether the device is connected to the device cradle; and indicating a condition of the first device based upon the determined status of the first parameter and the determined status of the device.

17. The method of claim 16, further comprising:

determining a second parameter, the second parameter indicating a usage time in which the device may be removed from the slot of the device cradle; and determining a status of the second parameter, wherein the indicating the condition of the first device is further based upon the determined status of the second parameter.

\* \* \* \* \*